US011535458B2

(12) United States Patent
Bonnain et al.

(10) Patent No.: US 11,535,458 B2
(45) Date of Patent: Dec. 27, 2022

(54) APPARATUS, SYSTEM AND METHOD FOR ORIENTATING ARTICLES

(71) Applicant: WestRock Packaging Systems, LLC, Atlanta, GA (US)

(72) Inventors: Jean-Christophe Bonnain, Châteauroux (FR); Frederic Limousin, Le Poinçonnet (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 588 days.

(21) Appl. No.: 16/479,685

(22) PCT Filed: Jan. 31, 2018

(86) PCT No.: PCT/US2018/016161
§ 371 (c)(1),
(2) Date: Jul. 22, 2019

(87) PCT Pub. No.: WO2018/144552
PCT Pub. Date: Aug. 9, 2018

(65) Prior Publication Data
US 2021/0380350 A1    Dec. 9, 2021

Related U.S. Application Data

(60) Provisional application No. 62/501,930, filed on May 5, 2017, provisional application No. 62/453,178, filed on Feb. 1, 2017.

(51) Int. Cl.
*B65G 47/244*    (2006.01)
*B65B 21/06*    (2006.01)
(Continued)

(52) U.S. Cl.
CPC ............ *B65G 47/244* (2013.01); *B65B 21/06* (2013.01); *B65B 35/58* (2013.01); *B65B 57/14* (2013.01);
(Continued)

(58) Field of Classification Search
CPC ...... B65G 47/848; B65G 47/84; B65G 47/08; B65G 47/91; B65G 47/084;
(Continued)

(56) References Cited

U.S. PATENT DOCUMENTS 4,583,910 A * 4/1986 Borgman ............... B65G 47/91
198/468.4
5,456,563 A * 10/1995 Halbo .................... B65B 21/183
198/470.1
(Continued)

FOREIGN PATENT DOCUMENTS

CN    104661918 A    5/2015
CN    204776190 U    11/2015
(Continued)

OTHER PUBLICATIONS

Office Action issued in Chinese Patent Application No. CN 201880023290.8, dated Oct. 10, 2020.
(Continued)

*Primary Examiner* — James R Bidwell
(74) *Attorney, Agent, or Firm* — Brian Goldberg; Rohini K. Garg

(57) ABSTRACT

A subsystem for orienting articles, the subsystem comprising a tool assembly comprising a carriage. A tool head has a first and a second article gripper rotationally coupled thereto. A first drive mechanism is coupled to the first article gripper. A second drive mechanism is coupled to the second article gripper. A sensor is configured to observe two adjacent articles. A controller is provided in communication with
(Continued)

the first and second drive mechanisms and the sensor. The controller is configured to determine the orientation of each of the two adjacent articles and to control the first and second drive mechanisms to rotate each of the two adjacent articles to a predefined orientation.

18 Claims, 15 Drawing Sheets

(51) Int. Cl.
    *B65B 35/58*     (2006.01)
    *B65B 57/14*     (2006.01)
    *B65G 43/08*     (2006.01)
    *B65G 47/08*     (2006.01)
    *B65G 47/84*     (2006.01)
    *B65G 47/91*     (2006.01)

(52) U.S. Cl.
    CPC .......... *B65G 43/08* (2013.01); *B65G 47/082* (2013.01); *B65G 47/843* (2013.01); *B65G 47/918* (2013.01); *B65G 2201/0247* (2013.01); *B65G 2203/0225* (2013.01); *B65G 2203/041* (2013.01); *B65G 2203/044* (2013.01)

(58) Field of Classification Search
    CPC .......... B65G 2201/0244; B65G 47/244; B65G 47/918; B65G 47/843; B65G 47/082; B65G 2201/02474; B65G 2203/041; B65G 21/06; B65G 43/08; B66B 21/18; B66B 35/58; B65C 9/06

USPC .......... 198/428, 430, 431, 418.5, 418.6, 432
See application file for complete search history.

(56) References Cited

U.S. PATENT DOCUMENTS

| | | | |
|---|---|---|---|
| 7,497,319 B2* | 3/2009 | Boldrini | ............... B65G 17/002 198/419.3 |
| 2015/0090404 A1* | 4/2015 | Van Wickeren | ........ B65B 21/06 156/556 |
| 2017/0203865 A1* | 7/2017 | Kalany | .................. B25J 9/1687 |
| 2020/0189776 A1* | 6/2020 | Stadler | .................... B65B 21/18 |

FOREIGN PATENT DOCUMENTS

| | | | | |
|---|---|---|---|---|
| CN | 112389712 | * | 2/2021 | ............. B65B 65/08 |
| DE | 3927848 A1 | | 2/1991 | |
| EP | 0645308 B1 | | 1/1996 | |
| EP | 1260469 A1 | | 11/2002 | |
| EP | 1584559 A1 | | 10/2005 | |
| JP | H11254367 A | | 7/1999 | |
| JP | 2001239484 A | | 9/2001 | |
| WO | WO2009129404 A1 | | 10/2009 | |

OTHER PUBLICATIONS

Search Report issued in Chinese Patent Application No. CN 201880023290.8, dated Sep. 28, 2020.
International Search Report dated Apr. 23, 2018 from PCT/US2018/016161.

* cited by examiner

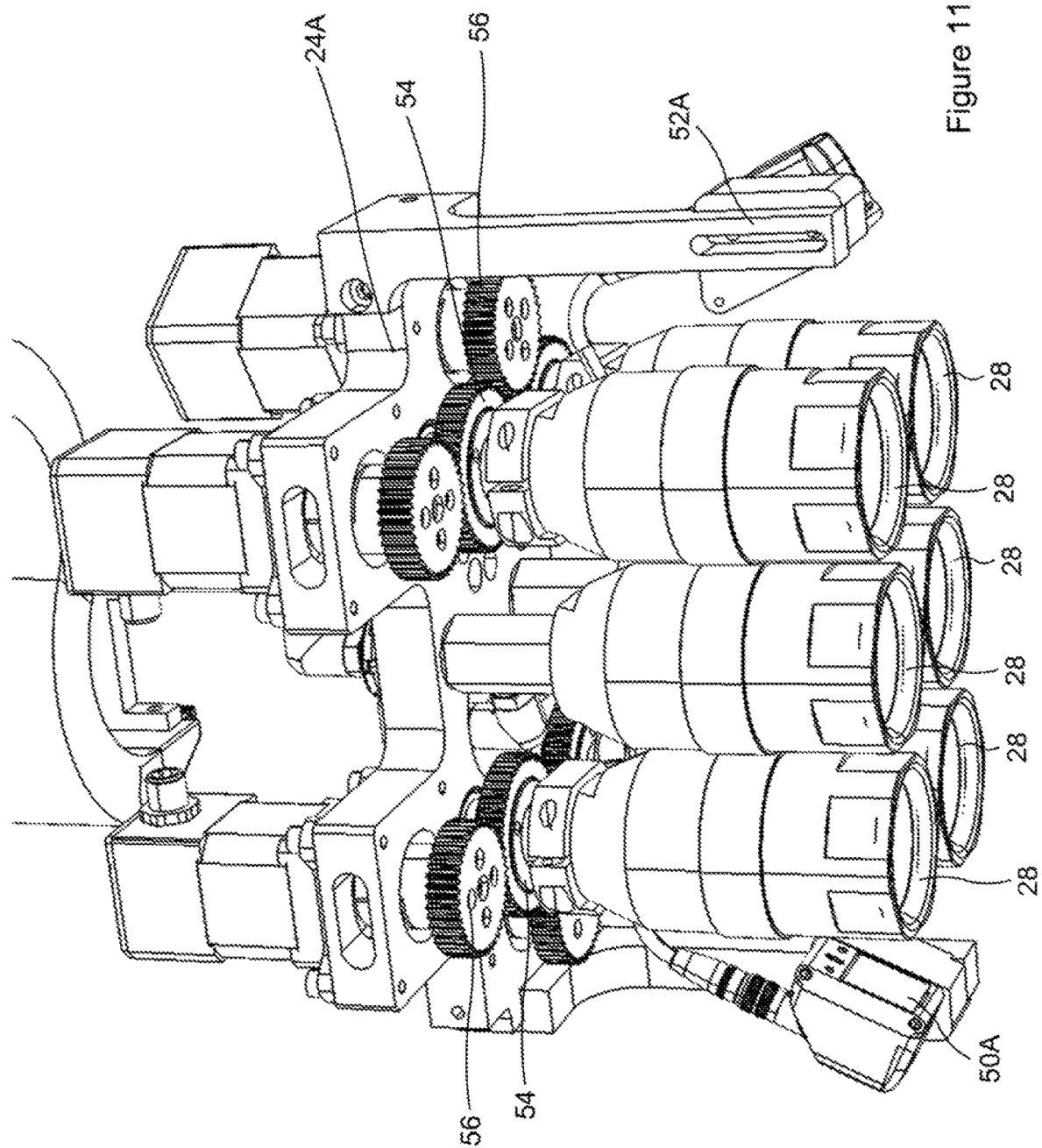

APPARATUS, SYSTEM AND METHOD FOR ORIENTATING ARTICLES

CROSS-REFERENCE TO RELATED APPLICATIONS

This application is a National Phase application of PCT Application PCT/US18/16161, filed Jan. 31, 2018, which claims the benefit of U.S. Provisional Patent Application No. 62/453,178, filed Feb. 1, 2017 and U.S. Provisional Patent Application No. 62/501,930 filed May 5, 2017, which are incorporated herein by reference in its entirety.

TECHNICAL FIELD

The disclosure relates to an apparatus, system and method for orientating articles, such as cans or bottles. More particularly, though not exclusively, the disclosure relates to an apparatus and a packaging subsystem that can orientate articles whilst those articles progress through a packaging sequence so as to provide articles that are correctly orientated with respect to their final packaging.

BACKGROUND

It is desirable that various labelling and advertising materials, attached to or printed on the outer surfaces of the articles which are to be packaged or displayed, be properly aligned with, for example, apertures or windows defined in the packaging carton, so that the advertising material is optimally visible.

Difficulties arise in the aforementioned alignment due to the nature of a packaging assembly. For instance, the articles to be packaged are often conveyed in a stream and guided by fixed guides and/or conveyed upon rotating conveyor belts. As the articles are conveyed they will likely be caused to rotate through friction against, for example, a fixed guide, or through vibration in the conveyor belt. Furthermore, it may well be the case that the articles are not aligned with one another when entering the packaging assembly. All of these factors, among others, make it difficult to achieve the aforementioned alignment between each article in a resulting package, and/or the relevant apertures or windows in the carton.

Where known systems provide mechanisms for rotating the articles, those mechanisms are fixed, and thus require the articles themselves to be brought to a halt so as to be rotated. Thus, these known systems disadvantageously require a reduction in the overall article throughput of the system.

Other known systems use fixed guides to rotate the articles and these fixed guides, as the name suggests, cannot dynamically cause differing levels of rotation in each article to be packaged. Thus, such systems are limited in terms of their flexibility when it comes to reliably orientating numerous articles through differing amounts of rotation.

It is also desirable to be able to employ a single packaging machine to form a plurality of packaging types or formats for example, but not limited to, multi-packs of different sizes, that is to say to form packages in which the number of primary product containers being formed into a package can be altered or reconfigured.

The present disclosure seeks to overcome or at least mitigate the disadvantages of such known subsystems.

SUMMARY

A first aspect of the disclosure provides an article orientation system comprising an article gripper, a motion controller and a sensor. A motion device is in communication with the motion controller and coupled to the article gripper. The sensor is adapted to recognise a predefined marker characteristic of an article. The sensor issues a signal to the motion controller indicative of a detection event. The motion controller issues a signal to the motion device to rotate the article by a desired angle of rotation so as to place the article in a predefined orientation.

A second aspect of the disclosure provides a method of orienting an article comprising:
  engaging an article group comprising at least one article with a first tool head;
  rotating at least one of the articles in the article group;
  observing said at least one of the articles with a sensor;
  recognising a marker characteristic provided on said at least one of the articles wherein the marker characteristic is indicative of a first orientation of said at least one of the articles;
  determining an angle of rotation;
  rotating said at least one of the articles from the first orientation by said angle of rotation so as to place said at least one of the articles in second, desired, orientation;
  disengaging said at least one of the articles.

A third aspect of the disclosure provides a method of orienting an article comprising:
  conveying articles in a stream;
  engaging an article group comprising at least one article with a first tool head;
  rotating at least one of the articles in the article group;
  observing said at least one of the articles with a sensor;
  recognising a marker characteristic provided on said at least one of the articles wherein the marker characteristic is indicative of a first orientation of said at least one of the articles;
  determining an angle of rotation;
  rotating said at least one of the articles from the first orientation by said angle of rotation so as to place said at least one of the articles in second, desired, orientation;
  disengaging said at least one of the articles;
  loading the article group into a carton to form a package having a display window wherein at least a portion of the said at least one of the articles is displayed within the display window in predefined orientation.

A fourth aspect of the disclosure provides a method of orienting an article comprising:
  loading an article group into a carton to form a package having a display window wherein at least a portion of at least one article is displayed within the display window;
  engaging the at least one article within the carton with a first tool head;
  rotating said at least one article;
  observing said at least one article with a sensor;
  recognising a marker characteristic provided on said at least one article wherein the marker characteristic is indicative of a first orientation of said at least one article;
  determining an angle of rotation;
  rotating said at least one article from the first orientation by said angle of rotation so as to place said at least one article in second, desired, orientation with respect to an opening provided by the display window;
  disengaging said at least one article.

A fifth aspect of the disclosure provides a method of orienting an article comprising:

conveying articles in a stream;
loading the article group into a carton to form a package having a display window wherein at least a portion of at least one article is displayed within the display window;
moving the at least one article from a first position within the carton to a second position in which the article is at least partially withdrawn from the carton;
engaging a withdrawn portion of the at least one article with a first tool head;
rotating said at least one article;
observing said withdrawn portion of the at least one article with a sensor;
recognising a marker characteristic provided on said withdrawn portion of the at least one article wherein the marker characteristic is indicative of a first orientation of said at least one of the articles;
determining an angle of rotation;
rotating said at least one article from the first orientation by said angle of rotation so as to place said at least one article in second, desired, orientation with respect to an opening provided by the display window.

Optionally, the method of orienting an article further comprises moving the at least one article so as to return the article to the first position within the carton.

Optionally, the method of orienting an article further comprises disengaging said at least one of the articles.

A sixth aspect of the disclosure provides a program for use in the orientation control system comprising:
an article gripper;
a motion controller;
a motion device in communication with the at least one motion controller and coupled to the article gripper;
a sensor;
wherein the program is configured such that when running on the orientation control system the orientation control system carries out an orientation method comprising:
engaging an article with the article gripper;
rotating the article gripper whereby rotating the engaged article;
observing said engaged article with a sensor;
recognising a marker characteristic provided on said engaged article wherein the marker characteristic is indicative of a first orientation of said engaged article;
determining an angle of rotation;
rotating said engaged article from the first orientation by said angle of rotation so as to place said engaged article in second, desired, orientation;
disengaging the article gripper from the engaged article.

A seventh aspect of the disclosure provides a subsystem for orienting articles. The subsystem comprises a tool assembly comprising a carriage. A tool head has a first article gripper rotationally coupled to the tool head and a second article gripper rotationally coupled to the tool head and mounted adjacent to the first article gripper. A first drive mechanism is coupled to the first article gripper; a second drive mechanism is coupled to the second article gripper. A sensor is configured to observe two adjacent articles. A controller is in communication with the first and second drive mechanisms and the sensor, the controller being configured to determine the orientation of each of the two adjacent articles and to control the first and second drive mechanisms to rotate each of the two adjacent articles to a predefined orientation.

An eighth aspect of the disclosure provides a subsystem for transferring groups of articles between a first conveyor and a second conveyor. The subsystem comprises a tool assembly comprising a carriage. A first tool head mounted to the carriage has a first plurality of article grippers mounted to the first tool head; a second tool head mounted to the carriage has a second plurality of article grippers mounted to the second tool head. An actuator mechanism is provided for moving the first and second tool heads with respect to each other such that a first group of articles engaged by the first tool head and a second group of articles engaged by the second tool head may be combined into a third group of articles.

Optionally, the first tool head is rotationally mounted to the carriage by a first rotational coupling and the second tool head is rotationally mounted to the carriage by a second rotational coupling.

Optionally, the first and second tool heads are rotated about their respective rotational couplings and simultaneously the first and second rotational couplings are moved linearly with respect to each other.

Optionally, the first tool head is rotated in first direction and the second tool head is rotated in a second opposing direction by the actuator mechanism.

Optionally, each of the first and second tool heads comprises at least one article gripper rotationally coupled to the carriage; a drive mechanism coupled to the at least one article gripper; a sensor configured to observe at least one article; and a controller in communication with the at least one drive mechanism and the sensor. The controller is configured to determine the orientation of the at least one article and to control the at least one drive mechanism to rotate the at least one article to a predefined orientation.

Optionally, each of the first and second tool heads comprises at least two article grippers rotationally coupled to the carriage; a drive mechanism coupled to each of the at least two article grippers; a sensor configured to observe two adjacent articles; and a controller in communication with each drive mechanism and the sensor. The controller is configured to determine the orientation of each of the two adjacent articles and to control each drive mechanism to independently rotate each of the two adjacent articles to a respective predefined orientation.

Optionally, the subsystem further comprises a moveable support member that retains at least one article in position relative to an article gripper with which it is in engagement as the at least one article is being conveyed.

Optionally, the subsystem further comprises a wall member, between which wall member and the moveable support member the at least one article is positioned, as it is being conveyed. A ninth aspect of the disclosure provides a method of rotating articles to be packaged. The method comprises conveying articles in a stream; engaging a first group of at least two articles with a first tool head; observing the at least two articles with a single sensor; rotating each of the at least two articles from a first orientation until they assume a desired orientation, as detected by the sensor, whilst those articles are being conveyed; and disengaging those selected one or more articles.

Optionally, the method further comprises transferring the at least two articles from a first conveyor to a second conveyor.

Optionally, the method further comprises engaging a second group of at least two further articles with a second tool head; observing the at least two further articles with a single second sensor; rotating each of the at least two further articles from a first orientation until they assume a desired orientation, as detected by the second sensor, whilst those articles are being conveyed; and disengaging those selected one or more articles.

Optionally, the method further comprises transferring the at least two further articles from a first conveyor to a second conveyor.

Optionally, the method further comprises combining the first group of at least two articles with the second group of at least two further articles into a single article grouping.

Optionally, the method further comprises detecting when each of the at least two articles has reached the desired orientation, and in response ceasing rotation of each article respectively.

A tenth aspect of the disclosure provides a packaging system for packaging articles, which packaging system comprises the subsystem.

Within the scope of this application it is envisaged that the various aspects, embodiments, examples, features and alternatives set out in the preceding paragraphs, in the claims and/or in the following description and drawings, may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIGS. 8 to 11 are various perspective views of a tool head of the subsystem of FIGS. 1 to 7;

DETAILED DESCRIPTION OF EXEMPLARY EMBODIMENTS

Detailed descriptions of specific embodiments of the packaging machine, subsystems, methods and packages are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packaging machine, subsystems, methods and packages described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
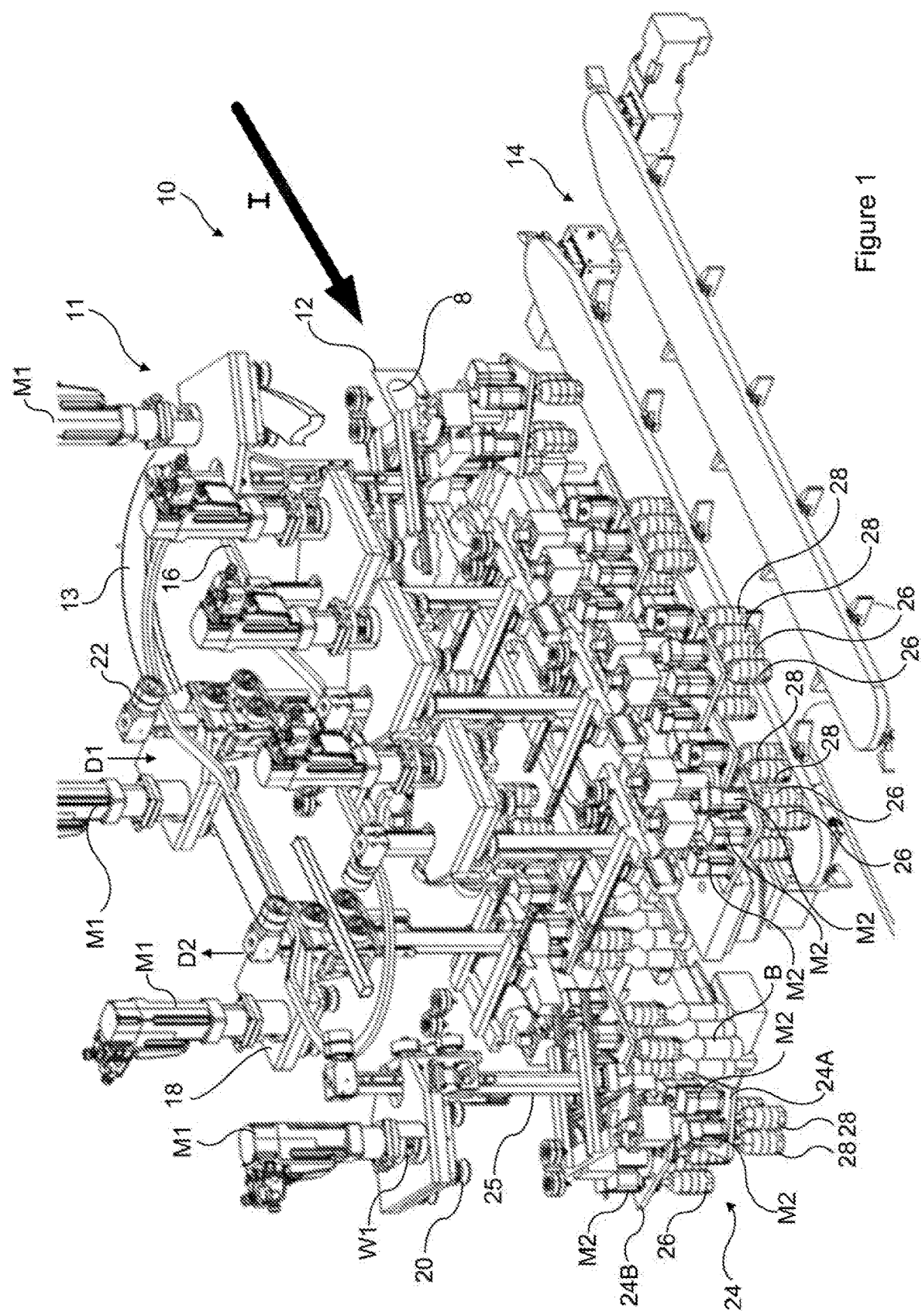
FIGS. 1 to 5 are perspective views of a subsystem of a packaging machine operating according to a first embodiment of the disclosure.

The present disclosure provides a subsystem 10, an embodiment of which is illustrated in FIG. 1. The subsystem 10 comprises an input or first conveyor 12 upon which an input stream I of primary product containers, hereinafter referred to as articles B, is conveyed. A continuous stream of articles B is conveyed to a metering apparatus which forms the input stream I into discrete groups G1, G2 of articles B.

In the illustrated embodiment, the metering apparatus forms groups G1, G2 comprising six articles B. The articles B in each group G1, G2 are arranged in a 2×3 matrix or array. In other embodiments, the groups may comprise more or less than six articles, configured in alternative arrangements.

In one exemplary embodiment, the input stream I of articles B may comprise two columns of articles B which are simultaneously conveyed in a downstream direction to the metering apparatus. A fixed guide may separate or be interposed between the columns. The metering apparatus comprises a first moveable support or retaining member in the form of a first lug and chain assembly disposed on a first side of the input conveyor 12 and a second moveable support or retaining member in the form of a second lug and chain assembly disposed on a second, opposing, side of the input conveyor 12. The first lug and chain assembly forms a first column of the input stream I of articles B into metered, discrete, spaced apart groups. The second lug and chain assembly forms a second column of the input stream I of articles B into metered, discrete, spaced apart groups. The first and second lug and chain assemblies are driven synchronously such that any given article B in the first column is conveyed downstream in phase with a corresponding article B in the second column. Each lug may engage a plurality of articles B in a respective one of the first and second columns, for example the lug may take the form of a comb arrangement, having a plurality of recesses, each recess being arranged for receiving a portion of an article B.

In one embodiment the metering apparatus comprises a plurality of metering elements in the exemplary form of combs 36, mounted to respective carriages (not shown), Each carriage is disposed upon a conveyor means; configured to be adjacent and parallel to the input stream I of articles B. The articles B travel at a first velocity in the input stream I. The conveyor means may be a conveyor belt; and is driven by a mechanical device, such as a motor; as is well known in the art. This exemplary conveyor means propels the carriages and hence the combs 36 at a second velocity that is greater than, and substantially parallel to, the first velocity of the articles in the input stream.

Each carriage is mounted upon the conveyor means in a slideable manner, such that it may be reciprocally displaced in a direction transverse to the direction of travel of the conveyor means. The specific embodiment of the slideable connection is not essential to the present invention and it is contemplated that one skilled in the art would readily apply one of numerous techniques known in the art to accomplish such functionality. However, in the example shown, the carriages are slideably mounted to a pair of guide rails (not illustrated). Each carriage is moveable in the transverse direction so as to bring a comb 36 mounted thereon into, and out of, contact with one or more articles B in the input stream I.

In this way the article or articles B engaged by each comb 36 are accelerated and separated from the subsequent articles B in the input stream I.

The subsystem 10 also comprises a transfer apparatus 11 for transferring metered groups of articles B from the input or first conveyor 12 to an output or second conveyor 14.

The transfer apparatus 11 takes the form of an overhead conveyor means. The transfer apparatus 11 comprises a guide rail or track 13 which is formed as an endless loop optionally in a substantially stadium shaped arrangement.

The guide rail 13 is arranged such that a first working reach is disposed over the input conveyor 12 such that groups of articles B can be picked up from the input conveyor 12. The guide rail 13 is arranged such that a second working reach is disposed over the output conveyor 14 such that groups of articles B can be placed upon the output conveyor 14.

The transfer apparatus 11 comprises a plurality of tools 24, each individually mounted upon the guide rail so as to be movable thereabout.

Figure 2:
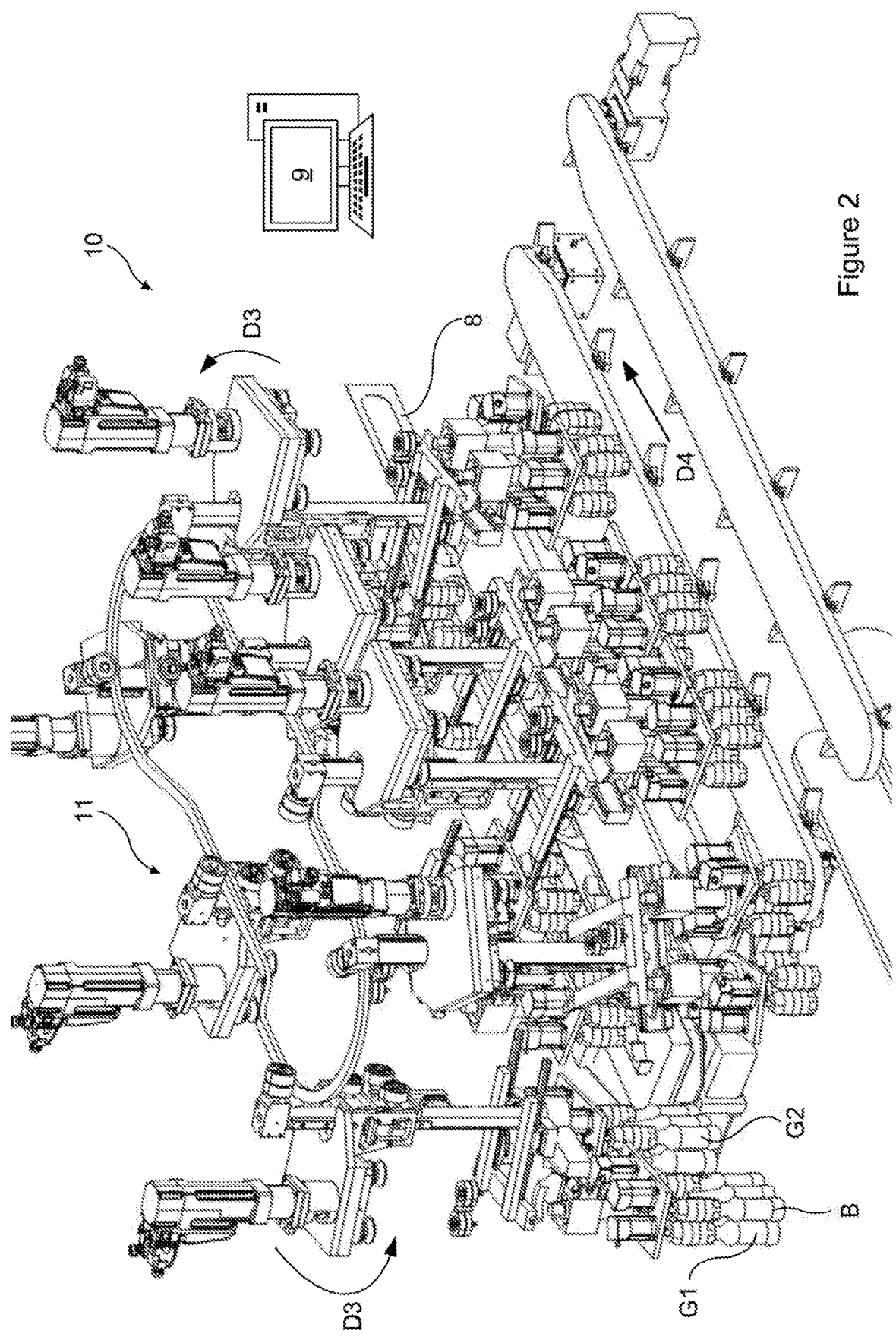
Figure 3:
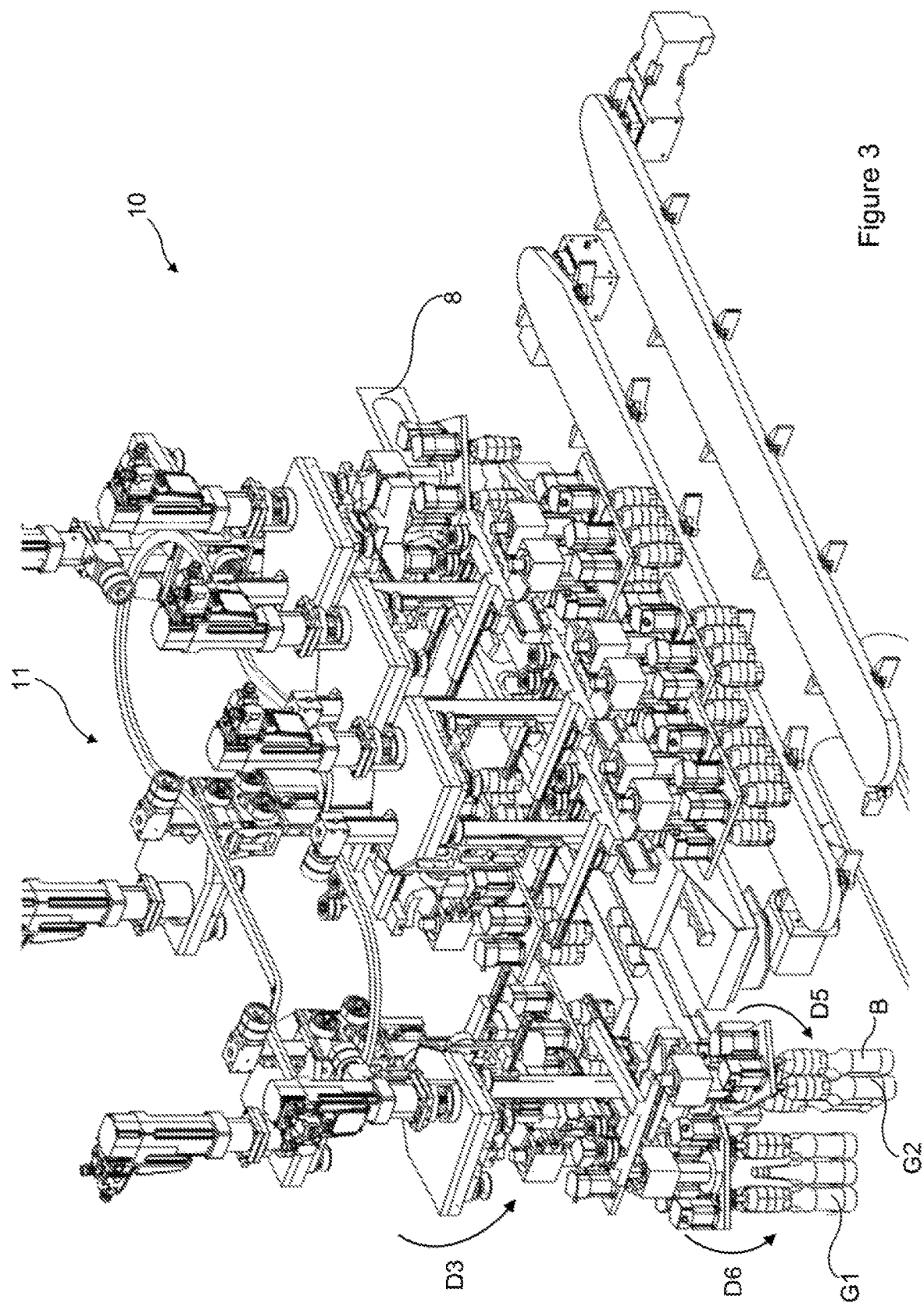
Figure 4:
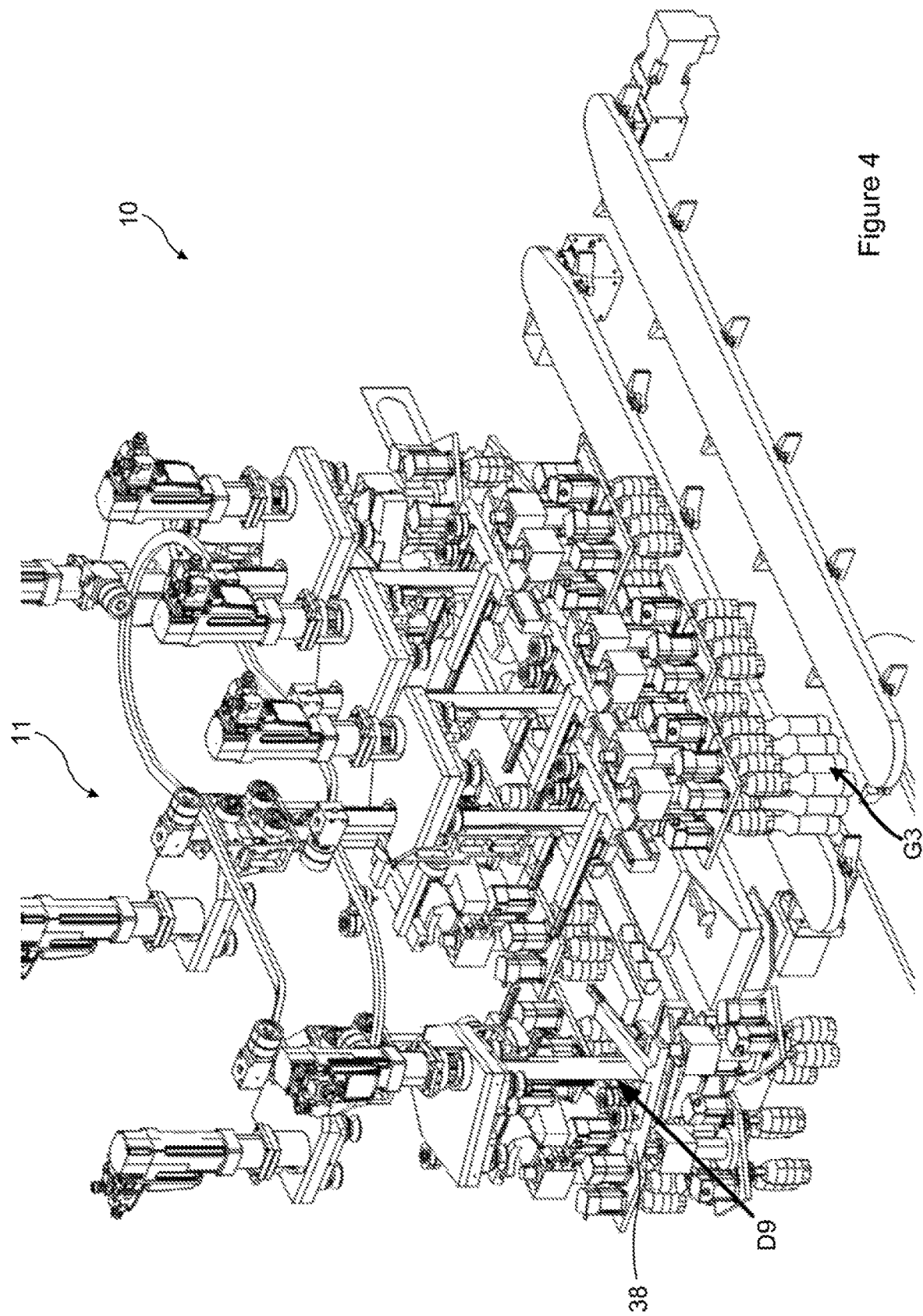

Each tool 24 comprises a carriage 18 mounted to the guide rail 13. Each tool 24 comprises a drive motor M1, in the form of an electric motor, for driving the tool 24 about the guide rail 13 as indicated by direction arrow D3, shown in FIG. 2. The carriages 18 each comprises at least one rail wheel 20; in the illustrated embodiments, each carriage 18 is provided with four rail wheels 20. The rail wheels 20 are rotatably mounted to the carriage 18. Each rail wheel 20 may be mounted upon a spindle extending downwardly from the base of the carriage 18; a bearing or bushing may be provided between the rail wheels 20 and the spindle to facilitate rotation thereabout.

The drive motor M1 is coupled to a drive wheel in the form of a sprocket or gear wheel W1. The gear wheel W1 engages with a ring gear or a rack (not shown) arranged as an endless loop or circuit. In other embodiments the gear wheel W1 may engage with a static chain configured in a loop. In still other embodiments the gear wheel W1 may be replaced with a friction wheel and the rack may be replaced with a track with which the friction wheel is in frictional contact.

Each tool 24 comprises a pair of tool heads 24A, 24B. The pair of tool heads 24A, 24B is mounted to a chassis 25. A first portion 25A of the chassis 25 is mounted to the carriage 18. A second portion 25B of the chassis 25 is translationally mounted to the first portion 25A of the chassis 25 such that the tool heads 24A, 24B can be moved vertically in a reciprocating fashion.

Figure 5:
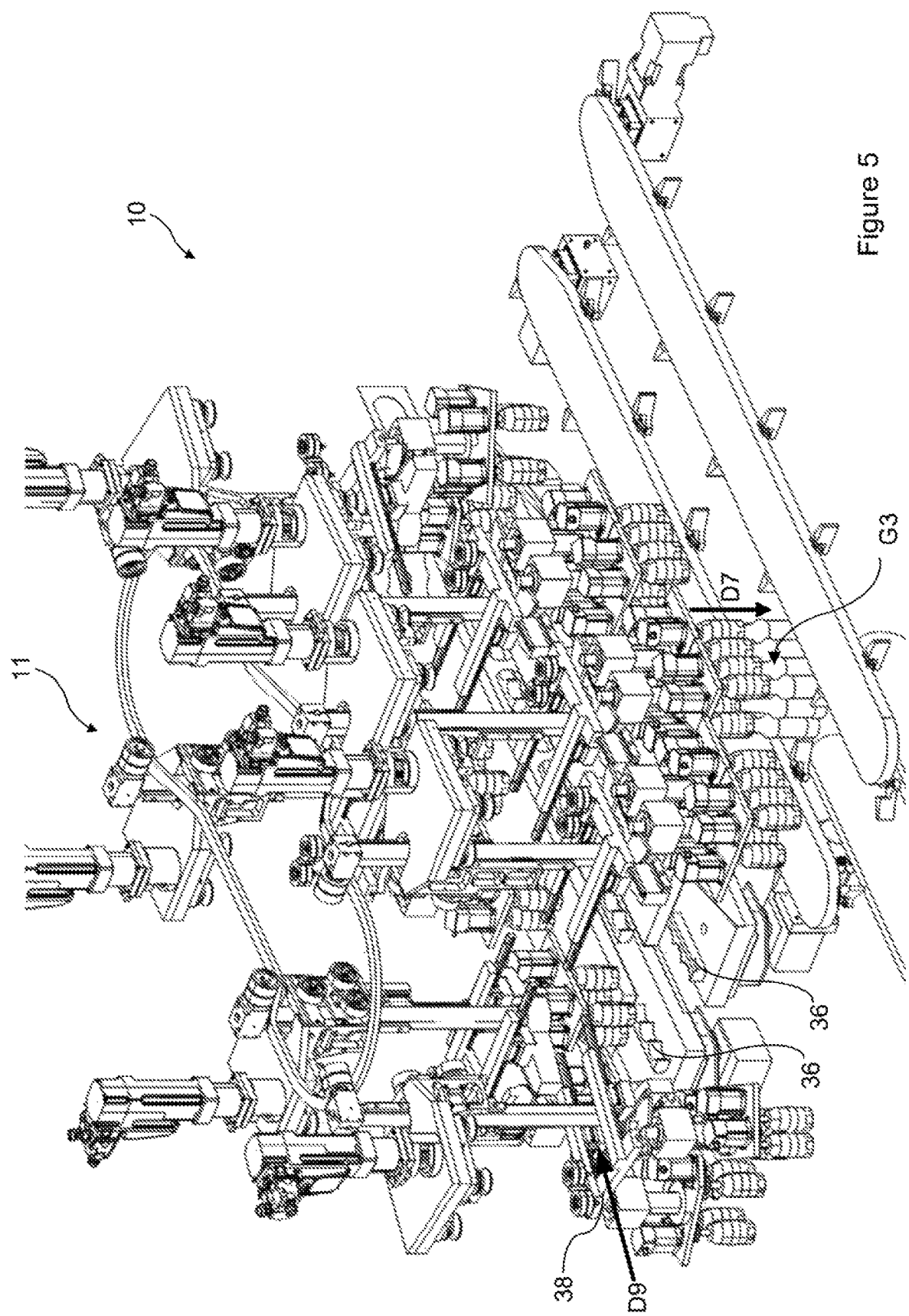

An upper end of the second portion 25B of the chassis 25 comprises a cam follower 22 mounted upon a cam path 16. As each tool 24 moves about the guide rail 13 the elevation of the tool heads 24A, 24B is altered according to a predefined pattern defined by the shape of the cam path 16. The second portion 25B of the chassis 25 slides upon or along the first portion 25A of the chassis 25. Specifically in the illustrated embodiment the cam path 16 is arranged to lower (direction arrow D1) and subsequently raise (direction arrow D2) the tool heads 24A, 24B when above the input conveyor 12. Similarly, the cam path 16 is arranged to lower (as indicated by direction arrow D7 in FIGS. 5 and 7) and subsequently raise the tool heads 24A, 24B when above the output conveyor 14.

Each tool 24 comprises a first tool head 24A and a second tool head 24B, see FIGS. 8 to 11. The first tool head 24A comprises at least one article lifter or gripper 28, and the second tool head 24B comprises at least one article lifter or gripper 26. In the illustrated embodiment the first tool head 24A comprises six article grippers 28 arranged in a 2×3 array. In the illustrated embodiment the second tool head 24B comprises six article grippers 26 arranged in a 2×3 array.

In the illustrated embodiment, the article lifters or grippers 26, 28 take the form of vacuum cups or suction cups. The article grippers 26, 28 are in communication with a vacuum system (not shown). In alternative embodiments the article grippers 26, 28 may mechanically engage the articles B, which is to say they may employ friction to lift the articles by pinching or constricting article grippers 26, 28 about an article B.

The article grippers 26, 28 are arranged in a group. The group may be arranged in an array comprising three columns, each column comprising two article grippers 26, 28. In this way the array comprises two rows of three article grippers 26, 28. Each group of article grippers 26, 28 engages with a similarly arranged group or array of articles B disposed upon the input conveyor 12.

The array comprises a first column of two articles B or article grippers 26, 28 at a first end, a second central column of two articles B or article grippers 26, 28 and a third column of two articles B or two article grippers 26, 28 at a second, opposing, end.

The article grippers 26, 28 provided in the endmost columns of each array, (the first and third columns) are controllably rotatable.

Alternatively, the article grippers 26, 28 disposed at the corners of each group or array are controllably rotatable.

In the illustrated embodiment the article grippers 26, 28 disposed in the central column of each group or array are fixedly mounted to the respective one of the first and second tool heads 24A, 24B.

A drive motor M2 is coupled to each rotatable article gripper 26, 28.

Each of the article grippers 26, 28 is rotatably mounted to the respective one of the first and second tool heads 24A, 24B by a spindle (not shown). A first gear 54 may be mounted to the spindle. A second gear 56 may be mounted to a drive shaft of the drive motor M2. The first and second gears 54, 56 mesh or mate such that rotation of the drive motor M2 effects rotation of the article gripper 26, 28 to which it is coupled.

The first tool head 24A comprises a pair of sensors 50A, 52A mounted thereon. The second tool head 24B comprises a pair of sensors 50B, 52B mounted thereon. The sensors 50A, 52A, 50B, 52B may take the form of a camera, vision sensor, image sensor, photo detector, CMOS sensor, CCD sensor or other suitable detector. The sensors 50A, 52A, 50B, 52B may each include a light source, such as but not limited to a Light Emitting Diode (LED) for illuminating the field of view of the sensor.

Each of the sensors 50A, 52A, 50B, 52B generates a signal that changes in accordance with the perceived surface features (such as colour, texture and reflectivity, amongst others) of a portion of each of a pair articles B proximate to the sensors 50A, 52A, 50B, 52B. A controller 9 (see FIG. 2) receives these generated signals, processes the signal and takes appropriate action to rotate each of the articles B in question to a desired orientation. The controller 9 may employ an image recognition program or software application to identify a predetermined visual detail or indicia, such as but not limited to text, graphics, a symbol or barcode.

Optionally, the controller 9 may comprise a display device for the display of information to an operator, and one or more input devices for input of information by an operator.

The input devices may take the form of, but are not limited to, a keyboard, computer mouse, trackpad, joystick, or touch screen.

A first sensor 50A on the first tool head 24A captures information indicative of the orientation of each of the articles B in engagement with a first pair of the rotatable article grippers 28, being the pair of article grippers 28 disposed at a first end of the group or array of article grippers 28.

A second sensor 52A on the first tool head 24A captures information indicative of the orientation of each of the articles B in engagement with a second pair of the rotatable article grippers 28, being the pair of article grippers 28 disposed at a second end of the group or array of article grippers 28.

A third sensor 50B on the second tool head 24B captures information indicative of the orientation of each of the articles B in engagement with a first pair of the rotatable article grippers 26, being; the pair of article grippers 26 disposed at a first end of the group or array of article grippers 26.

A fourth sensor 52B on the first tool head 24B captures information indicative of the orientation of each of the articles B in engagement with a second pair of the rotatable article grippers 26, being the pair of article grippers 26 disposed at a second end of the group or array of article grippers 26.

A controller 9 is in communication (wired or wirelessly) with the first and second sensors 50A, 52A, with the third and fourth sensors 50B, 52B and with each of the drive motors M2 of the first and second tool heads 24A, 24B. The controller 9 can determine the current orientation of the articles B in each of the rotatable article grippers 26, 28. The controller 9 controls the drive motors M2 to individually rotate each rotatable article gripper 26, 28 so as to place each of the articles B engaged therein in a desired or predefined orientation.

In this way a single sensor is employed to monitor or control the orientation of a pair of articles B.

Each of the first and second tool heads 24A, 24B is rotatably mounted to the chassis 25 so as to be rotatable with respect to the chassis 25, as shown in FIGS. 1 to 5.

Each of the first and second tool heads 24A, 24B is displaceably or movably mounted to the chassis 25, as shown in FIGS. 1 to 5. Optionally, the first and second tool heads 24A, 24B are displaceable linearly towards and away from each other.

An actuator mechanism is provided to effect rotation or displacement, or both rotation and displacement, of the first and second tool heads 24A, 24B with respect to the chassis 25. The actuator mechanism may be configured such that the first and second tool heads 24A, 24B are linearly displaceable with respect to each other in a reciprocal manner. The actuator mechanism may be configured to reciprocally rotate each of the first and second tool heads 24A, 24B with respect to the chassis 25.

Each of the first and second tool heads 24A, 24B is rotatably mounted to the chassis 25 by a rotational mounting which may take the form of a spindle or shaft. The first tool head 24A comprises a first cogwheel 46A. In the illustrated embodiment the first cogwheel 46A takes the form of a curved rack, segment gear or quadrant gear. The second tool head 24B comprises a second cogwheel 46B. In the illustrated embodiment the second cogwheel 46B takes the form of a curved rack, segment gear or quadrant gear.

The chassis 25 comprises a linear rack 48. Each of the first and second cogwheels 46A, 46B are in engagement, or meshed, with the linear rack 48.

The linear rack 48 and the first and second cogwheels 46A, 46B are employed to move the first and second tool heads 24A, 24B towards and away from each other.

The linear rack 48 and the first and second cogwheels 46A, 46B also facilitate rotation of each of the first and second tool heads 24A, 24B about their respective rotational mountings.

A cam 44A is mounted to the first tool head 24A. The cam 44A is rotatable about the rotational mounting along with the first tool head 24A. The cam 44A is coupled to a first slide 58 provided in a first limb 59. The first slide 58 takes the form of a channel or track; a follower 60A is mounted to the cam 44A. The follower 60A is received in the channel of the first slide 58. The follower 60A may comprise a bearing or bushing to facilitate movement of the follower 60A within the first slide 58.

A second cam 44B is mounted to the second tool head 24B. The second cam 44B is rotatable about the rotational mounting along with the second tool head 24B. The second cam 44B is coupled to a first slide 58. In alternative embodiments a second slide may be provided which is separate from the first slide 58. A second follower 60B is mounted to the second cam 44B. The second follower 60B is received in the channel of the first slide 58. The second follower 60B may comprise a bearing or bushing to facilitate movement of the second follower 60B within the first slide 58.

A second limb 61A is fixed to the first limb 59. The second limb 61A is substantially orthogonal to the first limb 59. The second limb 61A comprises a second slide 43A. The second slide 43A is slidably mounted to the chassis 25. A receiver 42A, which is mounted to the chassis 25, is in sliding engagement with the second slide 43A.

An optional third limb 61B is fixed to the first limb 59. The third limb 61B is substantially orthogonal to the first limb 59. The third limb 61B is spaced apart from the second limb 61A. The third limb 61B comprises a third slide 43B. The third slide 43B is slidably mounted to the chassis 25. A second receiver 42B, which is mounted to the chassis 25, is in sliding engagement with the third slide 43B.

The first limb 59 comprises a cam follower 40. The cam follower 40 is in engagement with a cam track (not shown). The cam track controls the orientation of the first and second tool heads 24A, 24B with respect to the chassis 25. The cam track is arranged so as to move the first limb 59 towards and away from the linear rack 48 as indicated by direction arrows D9, D10 respectively (see FIGS. 4,5 and 9). That is to say the first limb 59 is moved in a direction substantially perpendicular to the direction of travel of the tool 24 indicated by direction arrow D11 in FIG. 9 and by direction arrow D3 in FIG. 2.

In the illustrated embodiment, the second and third limbs 61A, 61B are coupled together by a connecting rod 38. The cam follower is mounted to the connecting road 38 such that the second and third limbs 61A, 61B are moved simultaneously. In other embodiments the second and third limbs 61A, 61B may be separately driven by the actuator mechanism. Each of the second and third limbs 61A, 61B may comprise or be coupled to a respective cam follower. In this way each of the second and third limbs 61A, 61B may be moved individually with respect to the chassis 25.

Figure 9:
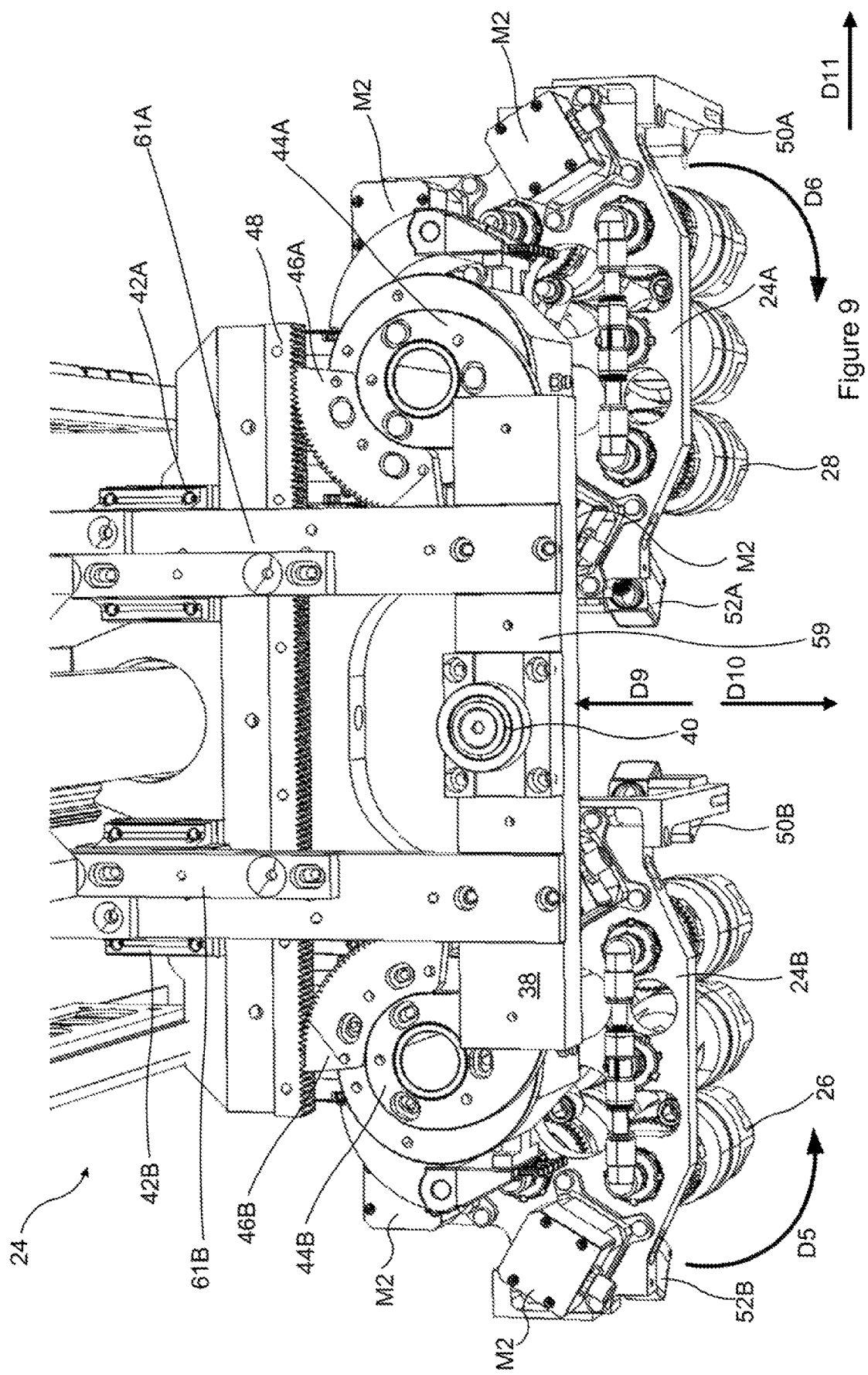
Figure 10:
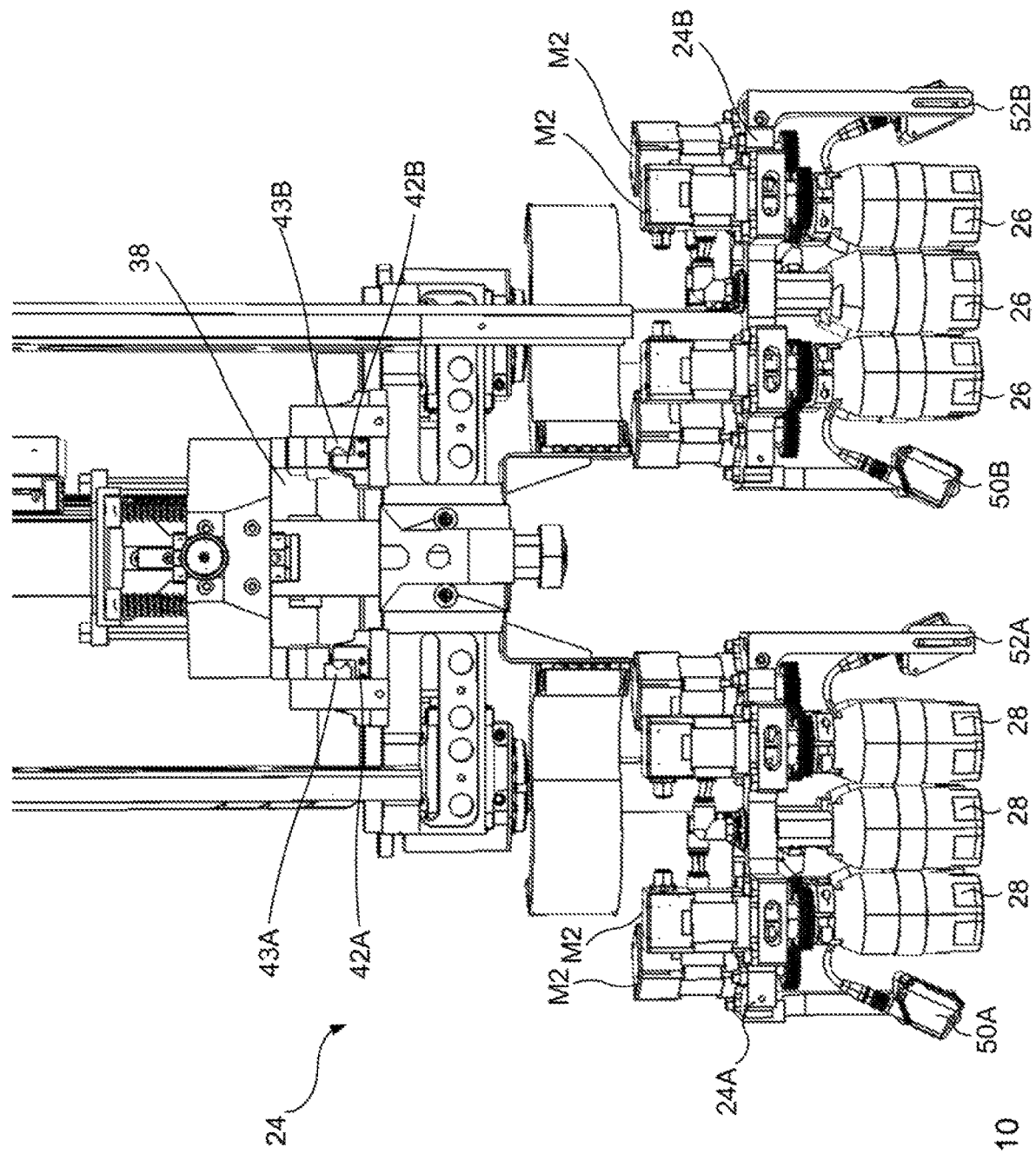

The first and second tool heads 24A, 24B are shown in a first condition (position and orientation) in FIG. 9. In the first condition the first and second tool heads 24A, 24B are spaced apart from each other and are oriented such that they are in an end to end relationship, albeit spaced apart. That is to say the first, second, third and fourth sensors 50A, 52A, 50B, 52B are disposed in a collinear manner. A first row of three article grippers 28 of the first tool head 24A is collinear with a first row of three article grippers 26 of the second tool head 24B. Similarly, a second row of three article grippers 28 of the first tool head 24A is collinear with a second row of three article grippers 26 of the second tool head 24B.

When the first limb 59 is moved inwardly towards the linear rack 48, as indicated by direction arrow D9, the first tool head 24A is rotated in a clockwise direction as indicated by direction arrow D6. The first tool head 24A is rotated through an angle of substantially 90 degrees. The first tool head 24A is simultaneously moved in a linear direction opposed to the direction of travel indicated by direction arrow D11. The second tool head 24B is rotated in a counter-clockwise direction as indicated by direction arrow D5. The second tool head 24B is rotated through an angle of substantially 90 degrees. The second tool head 24B is simultaneously moved linearly in the direction of travel indicated by direction arrow D11. In this way the first and second tool heads 24A, 24B are moved towards each other.

The result is to place the first and second tool heads 24A, 24B in a second condition, proximate each other such that the article grippers 26, 28 form an alternative grouping. The alternative grouping is arranged as an array comprising four columns; each column comprises three article grippers 26, 28. In this way the array comprises three rows of four article grippers 26, 28. In this way a first article group G1 and a second article group G2 can be formed into a third article group G3.

When the first limb 59 is moved outwardly, as indicated by direction arrow D10, away from the linear rack 48, the first tool head 24A is rotated in a counter-clockwise direction. The first tool head 24A is rotated through an angle of substantially 90 degrees. The first tool head 24A is simultaneously moved in a linear direction along the linear rack 48 in the direction of travel indicated by direction arrow D11. The second tool head 24B is rotated in a clockwise direction. The second tool head 24B is rotated through an angle of substantially 90 degrees. The second tool head 24B is simultaneously moved along the linear rack 48a in a linear direction opposed to the direction of travel indicated by direction arrow D11. In this way the first and second tool head 24A, 24B are moved away from each other back to the first position illustrated in FIG. 9.

The transfer apparatus 11 is configured to operate in a first mode, as shown in FIGS. 1 to 5, in which the transfer apparatus 11 combines two metered groups of articles G1, G2 into a single group G3. In the illustrated embodiment the transfer apparatus 11 forms two groups, each arranged in a 2×3 matrix, into a 3×4 matrix. In order to achieve this the first and second tool heads 24A, 24B are rotated through 90 degrees, clockwise and counter-clockwise respectively, and are moved linearly towards each other to bring a first group G1 into close proximity with a second group G2 to form a third group G3. The transfer apparatus 11 places each third group G3 formed upon the output conveyor 14. The third groups G3 are conveyed in a downstream direction as indicated by direction arrow D4, the direction of travel of the output conveyor 14 is substantially opposite to that of the input conveyor 12; such that the input and output conveyors are disposed substantially in a side by side relationship to each other optionally the input and output conveyors are arranged in parallel to each other. In other embodiments other arrangements may be employed for example, but not limited to, the input and output conveyors may be arranged at an oblique angle or orthogonally to each other, the input and output conveyors may be arranged so as to be substantially collinear with each other.

Figure 6:
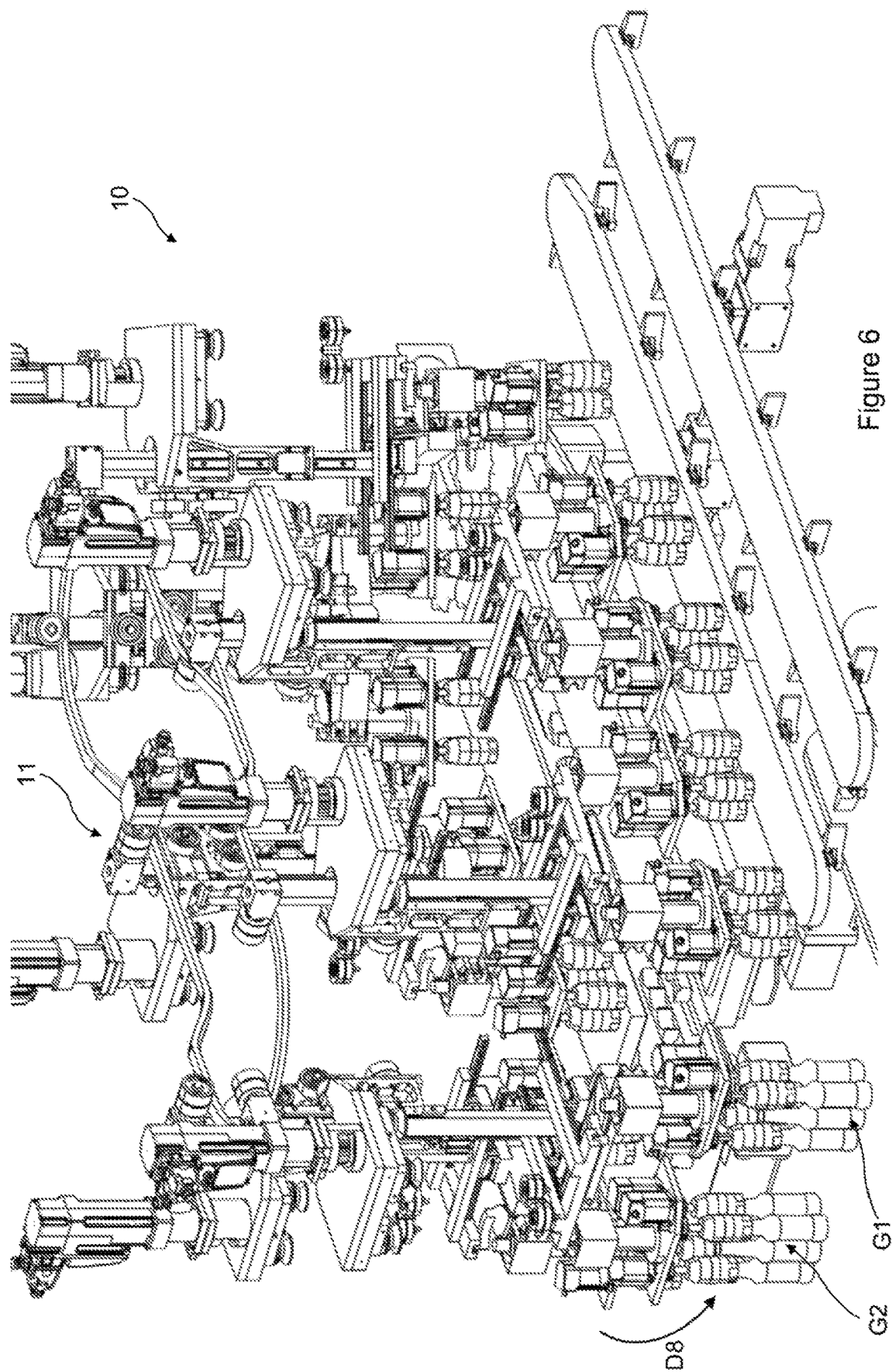
FIGS. 6 and 7 are perspective views of the subsystem operating according to a second embodiment of the disclosure.
Figure 7:
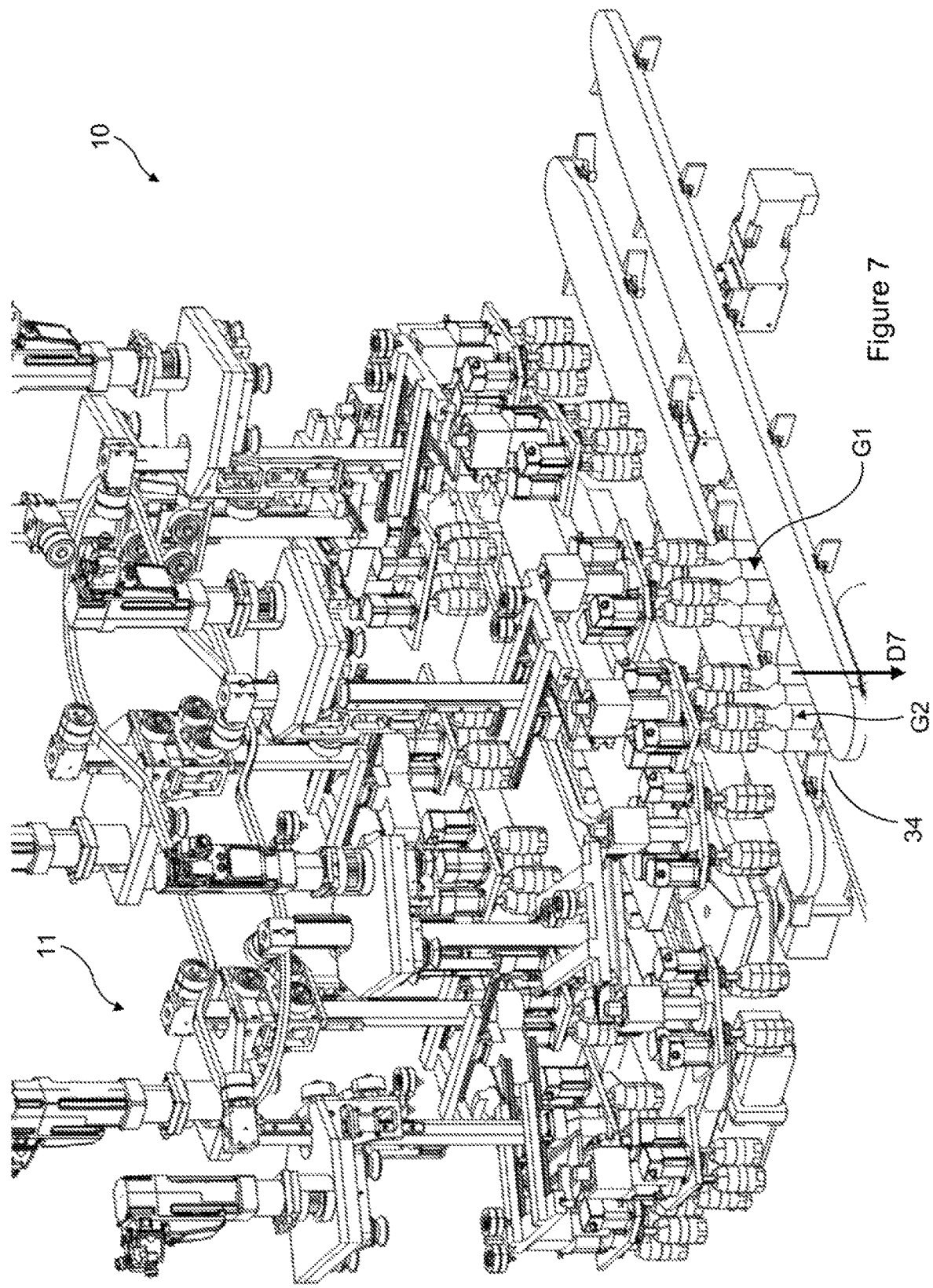
Figure 8:
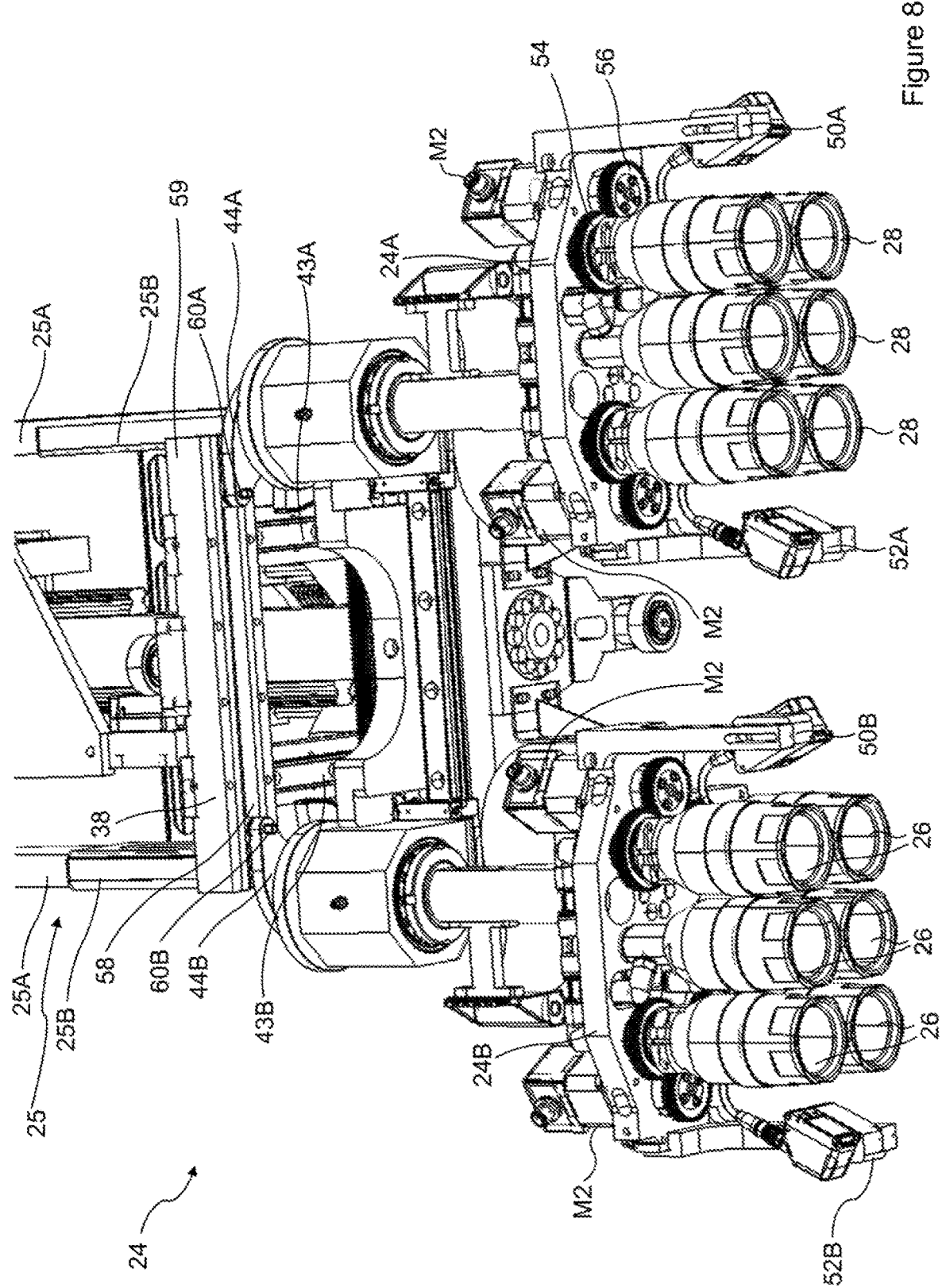

The transfer apparatus 11 is configured to operate in a second mode, as shown in FIGS. 6 and 7, in which the transfer apparatus 11 picks up two metered groups of articles G1, G2, conveys them to the output conveyor 14 as indicated by direction arrow D8, and places them upon the output conveyor 14 in two metered groups of articles G1, G2. The output conveyor 14 transfers the two groups separately therealong. In the illustrated embodiment the transfer apparatus 11 handles two groups each arranged in a 2×3 matrix, which remain as two groups each arranged in a 2×3 matrix upon the output conveyor 14.

In this way the subsystem 10 can transform the stream of articles B, such as beverage bottles or cans, into metered groups spaced apart at a predetermined pitch. That is to say it segregates the flow of articles B from the input or infeed conveyor 12 into groups of a predetermined number of articles B. The subsystem 10 is capable of forming two differently sized groups from the input stream I. The transfer apparatus 11 is capable of adjusting the orientation of at least some of the articles B in the groups G1, G2, G3.

Figure 13:
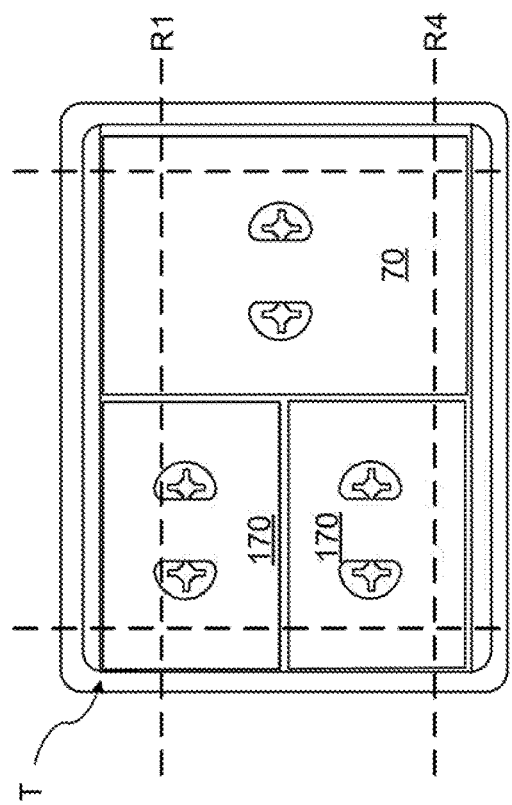
FIGS. 12 to 16 illustrate exemplary packaging arrangements which may be formed by a packaging machine employing the subsystem of FIG. 1.
Figure 12:
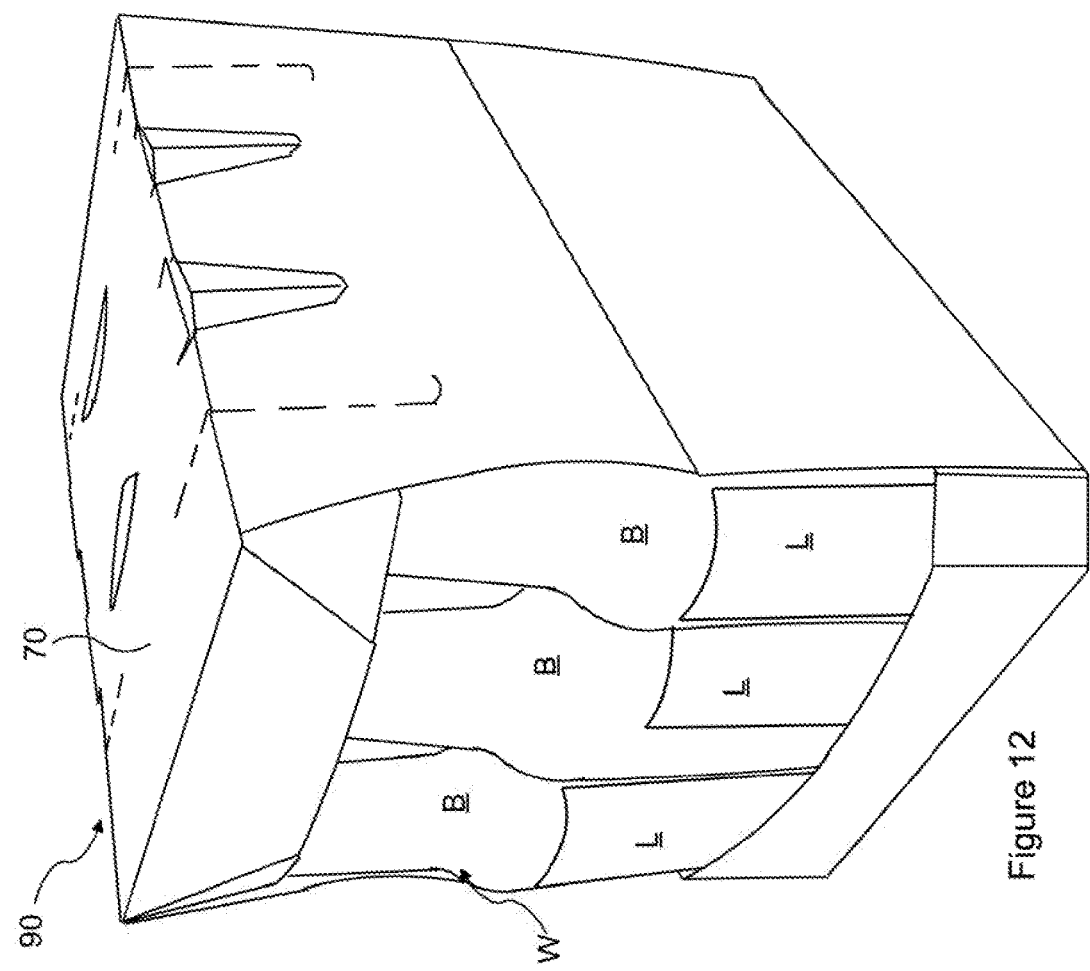

The groups of articles B can then be packaged into cartons or crates or other packaging. FIGS. 12 and 13 show exemplary packaging arrangements. FIG. 12 illustrates a carton 70 which is arranged to accommodate an array of articles in a 3×4 arrangement. The carton comprises a plurality of main panels for forming a tubular structure including a top wall, a base wall and opposed side walls. The carton 70 comprises end closure panels which partially close each end of the tubular structure. One or both of the ends of the tubular structure are partially open so as to form a window which exposes to view at least a portion of one or more articles B disposed adjacent thereto. FIG. 12 shows a first end of the carton 70; the articles B adjacent to the window W each comprise a label or other indicia L. The indicia L of each of the endmost articles B displayed in the window can be placed in a desired orientation by the transfer apparatus 11. In the illustrated embodiment the indicia are oriented such that the information displayed thereon is readable through the window W. In other embodiments the indicia L may be oriented such that it is not displayed in the window.

In alternative embodiments, the transfer apparatus 11 may be provided with an additional sensor and an orientation mechanism—a drive motor coupled to the respective article gripper 26, 28—for orienting the centre article B in the window W. It will be appreciated that only one of the central articles in each of the groups G1, G2 need be oriented as the other is substantially hidden from view in the centre of the package 90. In this way the groups G1, G2 can be brought together to form the enlarged grouping G3; the tool heads 24A, 24B can be placed in close proximity such that the first article group G1 can be placed proximate the second article group G2. The opposing, second, end of the carton 70 may also be partially open so as to form a second window. The transfer apparatus 11 is configured to be capable of rotating each of the articles B adjacent to the second window in a desired orientation.

The transfer apparatus 11 when operated in the first mode of operation, as illustrated in FIGS. 1 to 5 can be employed to group the articles B into a suitable configuration for being packaged by the exemplary package 90 illustrated in FIG. 12.

Figure 16:
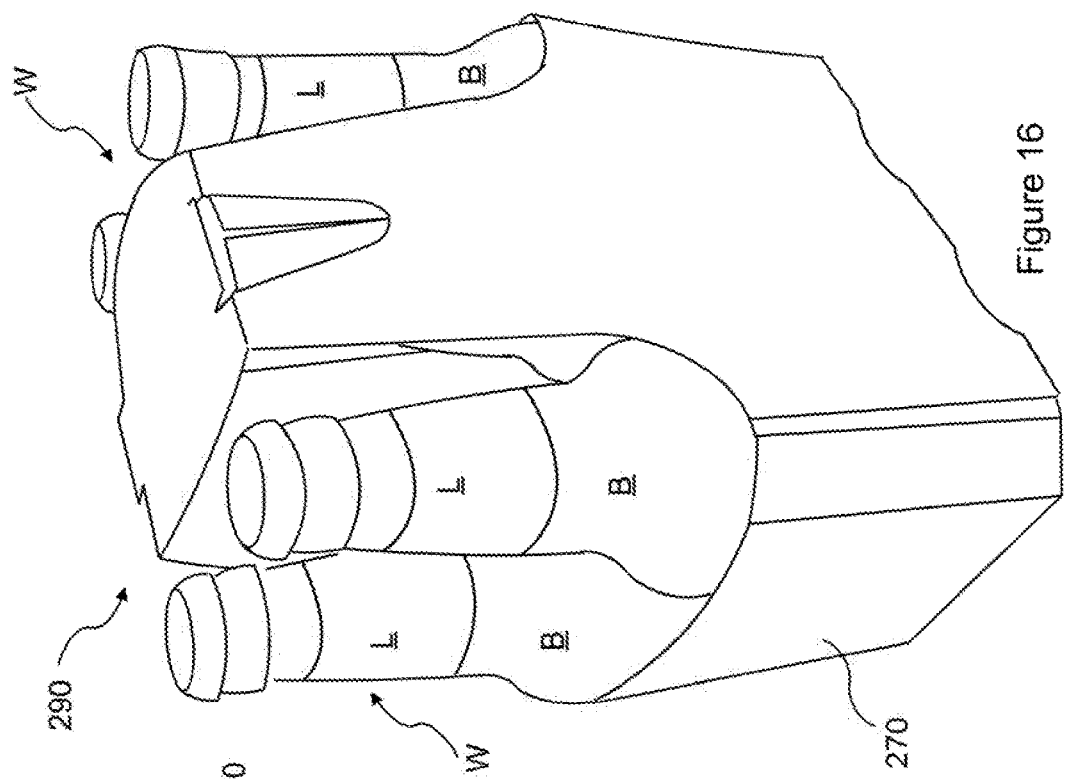
Figure 15:
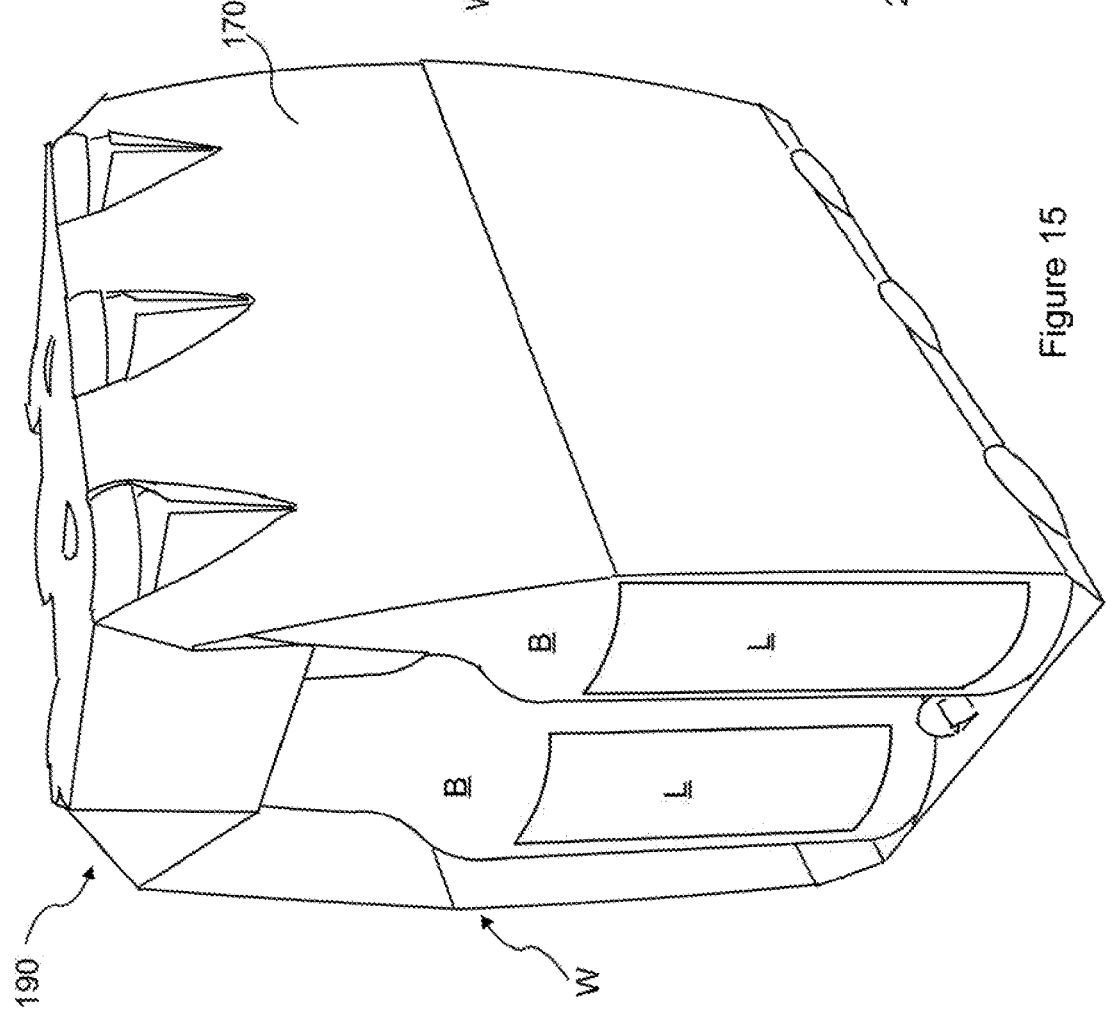

FIGS. 15 and 16 illustrate two alternative exemplary packages 190, 290. The packages 190, 290 each package six articles B in a 2×3 arrangement. The transfer apparatus 11, when operated in accordance with the second mode of operation as shown in FIGS. 6 and 7, may be employed to orient the articles B and group them in a suitable configuration for placement in the carton 170, 270 as shown in FIGS. 15 and 16.

The carton 170 in FIG. 15 comprises a plurality of main panels for forming a tubular structure including a top wall, a base wall and opposed side walls. The carton 170 comprises end closure panels which partially close each end of the tubular structure. One or both of the ends of the tubular structure are partially open so as to form a window W which exposes to view at least a portion of one or more articles disposed adjacent thereto. FIG. 15 shows a first end of the carton 170; the articles B adjacent to the window W each comprises a label or other indicia L. The indicia L of each of the endmost articles B are arranged so as to be oriented in a desired orientation. In the illustrated embodiment the indicia are oriented such that the information displayed thereon is readable through the window W. In other embodiments the indicia L may be oriented such that it is not displayed in the window. In the illustrated embodiment each of the articles B in the endmost row are similarly oriented; in other embodiments the articles B in the endmost row may each be manipulated into a different orientation by the transfer apparatus 11.

The carton 270 in FIG. 16 is configured as a basket carrier style carton and comprises a plurality of main panels for forming a tubular structure including a top wall, a base wall, opposed end walls and opposed side walls. Upper portions of each of the endmost articles B are exposed to view through a window struck or defined in part in the top wall, opposed side walls and a respective one of the end walls. The articles B adjacent to the window W each comprises a label or other indicia L. The indicia L of each of the endmost articles B are arranged so as to be orientated in a desired orientation.

Figure 14:
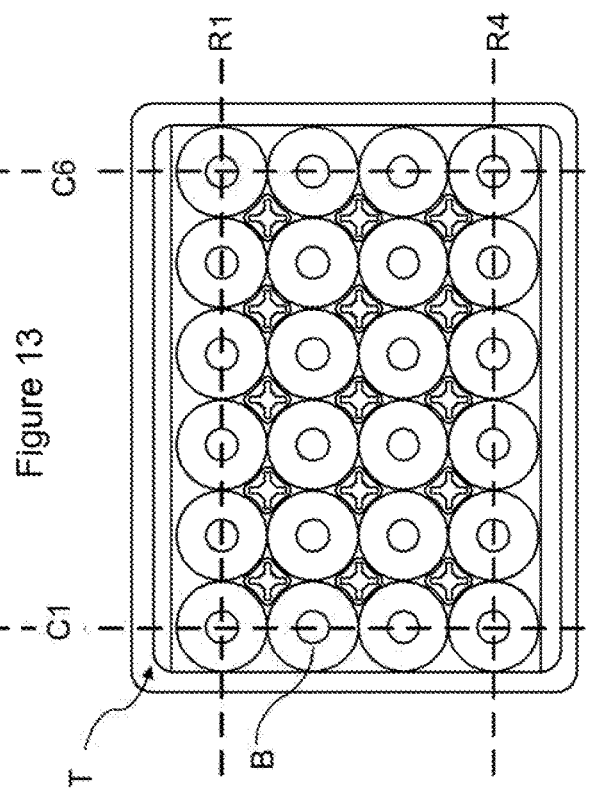

FIGS. 13 and 14 illustrate a tertiary package T. The tertiary package T is capable of accommodating twenty-four articles B in a 4×6 array. The tertiary package T can be employed in combination with a secondary package such as, but not limited to, those illustrated in FIGS. 12, 15 and 16. The tertiary package T is capable of receiving four secondary packages each comprising six articles in a 2×3 array. The tertiary package is capable of receiving two secondary packages each comprising twelve articles in a 4×3 array. The tertiary package is capable of receiving one secondary package comprising twelve articles in a 4×3 array and two secondary packages each comprising six articles in a 2×3 array, as illustrated in FIG. 13.

When the tertiary package comprises four secondary packages each comprising six articles B in a 2×3 array all of the articles in each of the endmost columns C1, C6 in the tertiary package have been oriented by the transfer apparatus 11.

FIG. 14 illustrates the tertiary package in which twenty-four loose articles—that is to say without a secondary package—are placed in a 4×6 array.

The transfer apparatus 11 can be operated in either the first or second mode so as to orient and group loose articles B for placement in the tertiary package T.

When the transfer apparatus 11 is operated in the second mode of operation, as shown in FIGS. 6 and 7, all of the articles B in each of the endmost columns C1, C6 in the tertiary package T have been oriented by the transfer apparatus 11.

When the subsystem 10 is in use, arrays of articles B are conveyed in a stream, into the working reach of the subsystem 10. In the illustrated embodiment, each array of articles B comprises two rows of three articles B, disposed side by side. The two rows may be disposed either side of an intermediate wall 8, which acts as a guide for the array, and may also aid rotation of the relevant articles B of the array of articles B by preventing friction between adjacent articles B of the opposing rows when those articles B are rotated by the tool assemblies 24.

At least some of the articles B of each selected group of articles B are rotated until such time as the relevant sensor generates a signal to indicate that the desired orientation of each article B has been reached. In alternative embodiments the controller 9 may determine the angle or degree of rotation of the article grippers 26, 28 which is required to place each orientable article B (those articles B which are engaged by rotatable article grippers 26, 28) in a desired orientation with respect to the other articles B or carton 70, 170, 270; the controller 9 may then have each drive motor M2 rotate the article gripper 26, 28 accordingly. At this point, the articles B that are correctly aligned cease to be rotated by the tool assembly 24. Once the endmost articles B of the selected groups of articles B have been correctly aligned, the tool assembly 24 moves upwardly picking up the groups G1, G2 of articles B. The articles are moved out of contact with the comb arrangements 36, and transferred to the output conveyor 14, to an exit end of the subsystem 10 for onward processing in, for example, a packaging system. The output conveyor 14 may convey the groups of articles B to downstream processing stations.

In some embodiments, the tool assembly 24 may rotate the articles B whilst the articles B are being transferred from the input conveyor 12 to the output conveyor 14. This may be in addition or alternatively to rotating the articles B when the articles B are disposed upon the input conveyor 12.

The subsystem 10 can, in one embodiment, be applied to a packaging system. The articles B are first formed into a stream before being selected to form a group or array by movable retaining members in the form of the lugs or combs 36. The moveable retaining members convey each group to the subsystem 10 of FIG. 1. Upon leaving the subsystem 10 the article groups and carton blanks are conveyed through one or more folding stations that form the blank into the set up carton, around the groups of articles. The package thus formed is then conveyed to an output end of the packaging line for distribution to points of sale.

Figure 17:
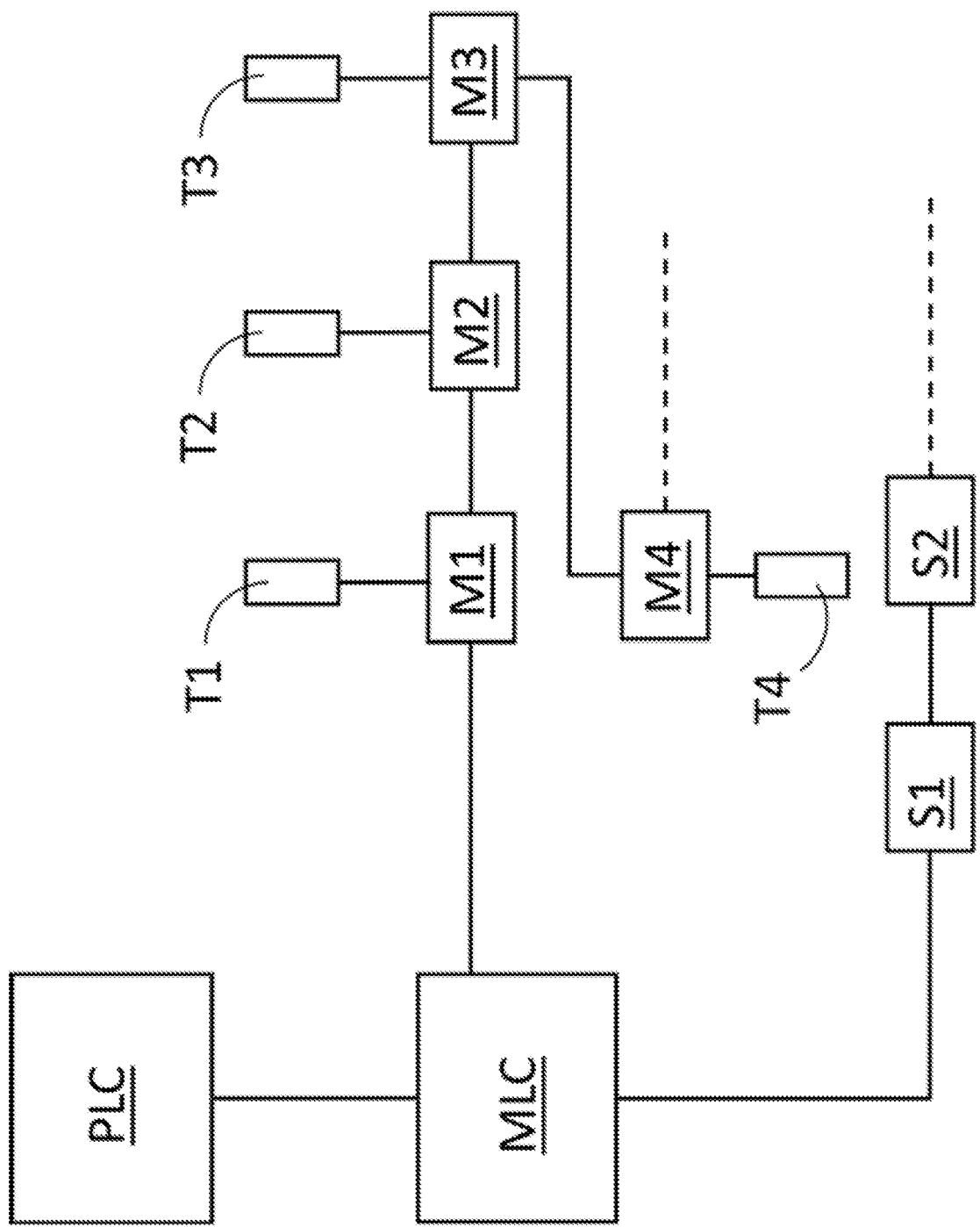
FIG. 17 is a schematic illustration of an orientation control subsystem according to a third embodiment of the disclosure.

FIG. 17 shows a schematic illustration of an orientation control system 200 for use in a packaging machine. The system 200 may be employed with the subsystem 10 of FIG. 1 or in an alternative the packaging machine in which control of the orientation of at least one article is desired.

The system 200 comprises a programmable logic controller PLC, the programmable logic controller PLC controls the packaging machine or subsystem 10. The programmable logic controller PLC may comprise one or more of the following; input modules, a central processing unit, output modules. The programmable logic controller PLC may be coupled to or in communication with a motion controller MLC such as, but not limited to, a stepper motor controller. The motion controller MLC is in communication with at least one motion device M1, M2, M3, M4 in the form of a drive motor such as, but not limited to, a stepper motor.

The illustrated embodiment comprises a plurality of motion devices M1, M2, M3, M4, specifically four motion devices M1, M2, M3, M4. In other embodiments more or less motion devices M1, M2, M3, M4 may be provided.

Each motion device M1, M2, M3, M4 is coupled to a gripper T1, T2, T3, T4. The grippers T1, T2, T3, T4 are adapted to engage an article the orientation of which it is desired to control. In some embodiments the article is rotated into a desired predefined orientation prior to being packaged within a carton or carrier. In other embodiments, the article is rotated into a desired predefined orientation whilst disposed within a carton or carrier. In still other embodiments, the article is rotated into a desired predefined orientation whilst partially disposed within a carton or carrier, in such embodiments a portion of the article to be oriented is exposed so as to be engaged by a gripper T1, T2, T3, T4, in some such embodiments the article may be moved or translated from a first stowed position to a second engageable position. In the first stowed position the article is disposed wholly or entirely within a chamber of the carton or carrier, in the second engageable position the article is at least partially withdrawn from the carton or carrier.

The motion devices M1, M2, M3, M4 and grippers T1, T2, T3, T4 illustrated may be mounted to a single tool head such that a single tool head may adjust the orientation of a plurality of articles which may be arranged in a group, array or matrix. In other embodiments each of the motion devices M1, M2, M3, M4 and grippers T1, T2, T3, T4 illustrated may be mounted to a respective tool head, such that the orientation of a single article within an article group may be controlled.

The system 200 comprises at least one sensor S1, S2. The sensors S1, S2 are in communication with the motion controller MLC.

The sensors S1, S2 are configured to monitor at least one article whilst the article is being rotated such that the orientation of the at least one article may be determined and such that the degree of rotation required of the at least one article to place an article in a predefined orientation can be calculated.

The sensor S1, S2 may be adapted or taught to search for or recognise a feature or characteristic of the article as it is rotated by one of the motion devices M1, M2, M3, M4, this feature may take the form of a marking or indicia displayed on the article, it may be a logo, image, shape, colour or text displayed on the article. In some embodiments, the indicia may be specifically provided on the article for the purpose of orienting the article.

Each of the sensors S1, S2 may be configured to be polled or energized repeatedly in order to detect a change in the state of the sensors S1, S2 indicative of recognition of the feature or characteristic of the article.

The sensors S1, S2 comprised in the system may be continuously active when the packaging machine is operational, but may be de-activated and re-activated on demand by an operator. Additionally or alternatively, data from each of any of the sensors S1, S2 may be stored and analysed over time to improve the confidence with which the system determines that a feature has been recognised.

The sensors may be configured to issue a signal to the motion controller MLC, the signal indicative of a recognition event, that is to say the sensor has recognised a predefined feature or characteristic of the article. The sensors be taught or programmed to recognise a selected feature or characteristic of an article to be packaged. The sensors may be configured to recognise a selected feature or characteristic of an article with a threshold probability for use as a marker. The threshold probability may be adjustable.

The system 200 may be configured to rotate an article through up to 360 degrees in order to find the selected feature or characteristic of an article.

Upon detection of the marker the motion controller MLC instructs the respective one of the motion device M1, M2, M3, M4 to rotate thorough a predefined angle. The motion controller MLC transmits a signal to the motion device which controls a parameter of operation of the motion device which is indicative of the angle required to place the article in the predefined orientation. The parameter of operation may be based on rotating the article at a constant speed for a requisite period of time. Alternatively, the parameter of operation may be based on rotating the article for a predefined period of time at a required speed.

In still other embodiments the parameter may be indicative of rotating the article a required number or discrete steps. The motor may be configured such that a full 360 degree rotation requires an integer number N of steps. In this way each discrete step is equal to 360/N degrees.

A programming device not shown may be coupled to or integrated within or otherwise in communication with the programmable logic controller PLC such that the programming device is in communication with the motion controller MLC and optionally with the sensor S1. The programming device may be employed to configure or install a computer program for carrying out a packaging method such as, but not limited to, an article orientation method.

Figure 18:
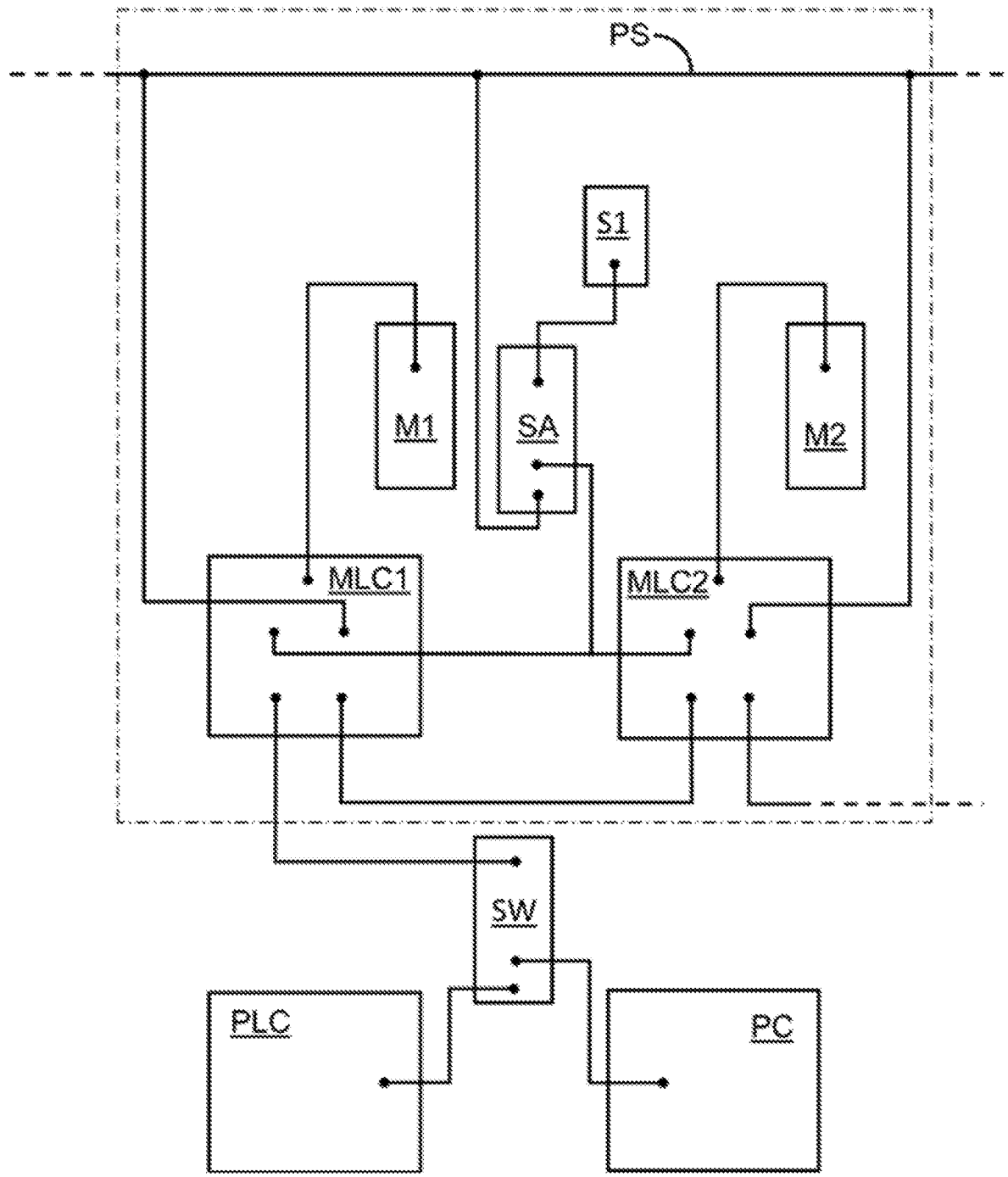
FIG. 18 is a schematic illustration of an orientation control subsystem according to a fourth embodiment of the disclosure.

FIG. 18 shows a schematic illustration of an alternative orientation control system 300 for use in a packaging machine. The system 300 may be employed with the subsystem 10 of FIG. 1 or in an alternative the packaging machine in which control of the orientation of at least one article is desired.

The system 300 comprises a programmable logic controller PLC, the programmable logic controller PLC controls the packaging machine or subsystem 10. The programmable logic controller PLC may comprise one or more of the following; input modules, a central processing unit, output modules. The programmable logic controller PLC may be coupled to or in communication with motion controllers MLC1, MLC2 such as, but not limited to, a stepper motor controller. The motion controllers MLC1, MLC2 are in communication with a motion device M1, M2, respectively. The motion devices M1, M2 may take the form of a drive motor such as, but not limited to, a stepper motor.

The motion controllers MLC1, MLC2 are in communication with a power supply. Each of the motion controller may be in electrical communication with a respective one of the motion device M1, M2 so as to provide electrical power thereto. Each of the motion controller may be in data communication with a respective one of the motion device M1, M2 so as to send and or receive information regarding the operation or condition of the motion devices M1, M2.

A first motion controller MLC1 may be in communication with a second motion controller MLC2. In embodiments having two or more motion controllers MLC1, MLC2 the motion controllers MLC1, MLC2 may be coupled or connected in series, coupled together in sequence or in a ring, so as to be daisy-chained one to the next.

The first motion controller MLC1 may be coupled to or in communication with the programmable logic controller PLC and/or a programming device PC. An optional networking device SW which may take the form of a network switch (also called switching hub, bridging hub, or MAC bridge) may be provided to facilitate coupling of the programmable logic controller PLC and/or a programming device PC to each other and to the first motion controller MLC1. The programmable logic controller PLC and/or the programming device PC may in communication with a second motion controller MLC2 via the first motion controller MLC1. In alternative embodiments the second motion controller MLC2 may be in communication with networking device SW.

The illustrated embodiment comprises a plurality of motion devices M1, M2, specifically two motion devices M1, M2. In other embodiments more or less motion devices M1, M2, may be provided.

Each motion device M1, M2 is coupled to a gripper (not shown). The grippers are adapted to engage an article the orientation of which it is desired to control.

The motion devices M1, M2 and respective grippers may be mounted to a single tool head such that a single tool head may adjust the orientation of a plurality of articles which may be arranged in a group, array or matrix. In other embodiments each of the motion devices M1, M2, and respective grippers may be mounted to a respective tool head, such that the orientation of a single article within an article group may be controlled.

The system 300 comprises at least one sensor S1. The sensors S1 is in communication with each of the first and second the motion controllers MLC1, MLC2. An optional amplifier may be provided between the sensor S1 and the first and second motion controllers MLC1, MLC2.

The sensor S1 is configured to monitor two articles simultaneously whilst the articles are being rotated such that the orientation of each of the articles may be determined and such that the degree of rotation required to place each article in a predefined orientation may be calculated.

The sensor S1, S2 may be adapted or taught to search for or recognise a feature or characteristic of the article as it is rotated by one of the motion devices M1, M2, M3, M4, this feature may take the form of a marking or indicia displayed on the article, it may be a logo, image, shape, colour or text displayed on the article. In some embodiments, the indicia may be specifically provided on the article for the purpose of orienting the article.

A processing device SA may be provided to handle image recognition and learning. The processing device SA may be coupled or otherwise in communication with the sensor S1 and at least one of the motion controllers MLC1, MLC2. In alternative systems, the processing device SA may be an integral part of the sensor unit s1 or of one or more of the motion controllers MLC1, MLC2.

A programming device PC may be coupled to or otherwise in communication with the programmable logic controller PLC, the motion controllers MLC1, MLC2 and optionally with the sensor S1.

The system 200 comprises a memory device and a processor for executing a computer program configured for carrying out a method of orientation. The method of orientation comprises:
engaging an article group comprising at least one article with a first tool head;
rotating at least one of the articles in the article group;
observing said at least one of the articles with a sensor;
recognising a marker characteristic provided on said at least one of the articles wherein the marker characteristic is indicative of a first orientation of said at least one of the articles;
determining an angle of rotation;
rotating said at least one of the articles from the first orientation by said angle of rotation so as to place said at least one of the articles in second, desired, orientation;
disengaging said at least one of the articles.

In an alternative embodiment the method of orientation comprises:
conveying articles in a stream;
engaging an article group comprising at least one article with a first tool head;
rotating at least one of the articles in the article group;
observing said at least one of the articles with a sensor;
recognising a marker characteristic provided on said at least one of the articles wherein the marker characteristic is indicative of a first orientation of said at least one of the articles;
determining an angle of rotation;
rotating said at least one of the articles from the first orientation by said angle of rotation so as to place said at least one of the articles in second, desired, orientation;
disengaging said at least one of the articles;
loading the article group into a carton to form a package having a display window wherein at least a portion of the said at least one of the articles is displayed within the display window in predefined orientation.

In yet another embodiment the method of orientation comprises:
loading an article group into a carton to form a package having a display window wherein at least a portion of at least one article is displayed within the display window;
engaging the at least one article within the carton with a first tool head;
rotating said at least one article;
observing said at least one article with a sensor;
recognising a marker characteristic provided on said at least one article wherein the marker characteristic is indicative of a first orientation of said at least one article;
determining an angle of rotation;
rotating said at least one article from the first orientation by said angle of rotation so as to place said at least one article in second, desired, orientation with respect to an opening provided by the display window;
disengaging said at least one article.

In a further embodiment the method of orientation comprises:
conveying articles in a stream;
selecting one or more articles from the stream to form an article group;
loading the article group into a carton to form a package having a display window wherein at least a portion of at least one article is displayed within the display window;
moving the at least one article from a first position within the carton to a second position in which the article is at least partially withdrawn from the carton;
engaging a withdrawn portion of the at least one article with a first tool head;
rotating said at least one article;
observing said withdrawn portion of the at least one article with a sensor;
recognising a marker characteristic provided on said withdrawn portion of the at least one article wherein the marker characteristic is indicative of a first orientation of said at least one of the articles;
determining an angle of rotation;
rotating said at least one article from the first orientation by said angle of rotation so as to place said at least one article in second, desired, orientation with respect to an opening provided by the display window.

The method of orientation may further comprises moving the at least one article so as to return the article to the first position within the carton and disengaging said at least one article.

The system 300 may comprise a memory device and a processor for executing a computer program configured for carrying out a method of orientation according to the forgoing paragraphs. It can be appreciated that various changes may be made within the scope of the present invention. For example, the systems illustrated in FIGS. 17 and 18 illustrate devices which may execute computer programs or subroutines so as control or monitor components forming a packaging machine. In some embodiments the two or more devices illustrated may combined such that a single hardware component handles two or more of the control operations illustrated. For example, but not limited to, a single motion controller may control multiple motion devices, a single image processing device may interpret data from a plurality of image sensors. The programmable logic controller may perform the functions of any or all of the motion controllers or image processing devices.

The above sets out an exemplary embodiment of a subsystem and an exemplary application of that subsystem within a packaging system. One skilled in the art would readily understand that variations of the features set out above may be affected without departing from the inventive concept defined by the claims below.

The invention claimed is:

1. A subsystem for orienting articles, the subsystem comprising:
 a tool assembly comprising:
  a carriage;
  a tool head having:
   a first article gripper rotationally coupled to the tool head;
   a second article gripper rotationally coupled to the tool head and mounted adjacent to the first article gripper;
   a first drive mechanism coupled to the first article gripper;
   a second drive mechanism coupled to the second article gripper;
   a sensor configured to observe two adjacent articles while at least one of the two adjacent articles is being rotated by one of the first drive mechanism and the second drive mechanism;
  a controller in communication with the first and second drive mechanisms and the sensor, the controller configured to determine the orientation of each of the two adjacent articles and to control the first and second drive mechanisms to rotate each of the two adjacent articles to a predefined orientation based on signals received from the sensor.

2. The subsystem according to claim 1, further comprising a moveable support member that retains at least one article in position relative to an article gripper with which it is in engagement as the at least one article is being conveyed.

3. The subsystem according to claim 2, further comprising a wall member, between which wall member and the moveable support member the at least one article is positioned, as it is being conveyed.

4. A packaging system for packaging articles, which packaging system comprises the subsystem of claim 1.

5. The subsystem of claim 1 wherein the controller is configured to receive the signals from the sensor and to determine, for each of the two adjacent articles, that the predefined orientation has been reached based on the signals received from the sensor; and wherein the controller is further configured to control the first and second drive mechanisms to discontinue rotation of each of the two adjacent articles based on determining, for each of the two adjacent articles, that the predefined orientation has been reached.

6. A subsystem for transferring groups of articles between a first conveyor and a second conveyor, the subsystem comprising:
 a tool assembly comprising:
  a carriage:
   a first tool head mounted to the carriage and having a first plurality of article grippers mounted to the first tool head;
   a second tool head mounted to the carriage and having a second plurality of article grippers mounted to the second tool head, wherein the first and the second tool heads are linearly displaceable with respect to each other;
  an actuator mechanism for moving the first and second tool heads linearly with respect to each other such that a first group of articles engaged by the first tool head and a second group of articles engaged by the second tool head is combinable into a third group of articles.

7. A subsystem according to claim 6 wherein the first tool head is rotationally mounted to the carriage by a first rotational coupling and the second tool head is rotationally mounted to the carriage by a second rotational coupling.

8. A subsystem according to claim 7 wherein the first and second tool heads are rotated about their respective rotational couplings and simultaneously the first and second rotational couplings are moved linearly with respect to each other.

9. A subsystem according to claim 7 wherein the first tool head is rotated in first direction and the second tool head is rotated in a second opposing direction by the actuator mechanism.

10. A subsystem according to claim 6 wherein each of the first and second tool heads comprises:
 at least one article gripper rotationally coupled to the carriage;
 a drive mechanism coupled to the at least one article gripper;
 a sensor configured to observe at least one article;
 a controller in communication with the at least one drive mechanism and the sensor, the controller being configured to determine the orientation of the at least one article and to control the at least one drive mechanism to rotate the at least one article to a predefined orientation.

11. A subsystem according to claim 6 wherein each of the first and second tool heads comprises:
 at least two article grippers rotationally coupled to the carriage;
 a drive mechanism coupled to each of the at least two article grippers;
 a sensor configured to observe two adjacent articles;
 a controller in communication with each drive mechanism and the sensor, the controller being configured to determine the orientation of each of the two adjacent articles and to control each drive mechanism to independently rotate each of the two adjacent articles to a respective predefined orientation.

12. A new subsystem according to claim 6 wherein the actuator mechanism is configured to move the first and second tool heads with respect to each other such that the first group of the articles is engaged by the first tool head simultaneously as the second group of articles is engaged by the second tool head.

13. A method of rotating articles to be packaged, which method comprises:
   conveying articles in a stream of unpackaged articles;
   engaging a first group of at least two articles with a first tool head
   observing the at least two articles with a single sensor;
   rotating each of the at least two articles from a first orientation until they assume a desired orientation, as detected by the sensor, whilst those articles are being conveyed;
   disengaging one or more articles from the first group of a least two articles; and
   transferring the at least two articles from a first conveyor to a second conveyor.

14. The method according to claim 13, further comprising:
   engaging a second group of at least two further articles with a second tool head;
   observing the at least two further articles with a single second sensor;
   rotating each of the at least two further articles from a first orientation until they assume a desired orientation, as detected by the second sensor, whilst those articles are being conveyed; and
   disengaging one or more articles from the second group of at least two further articles.

15. The method according to claim 14, further comprising:
   transferring the at least two further articles from a first conveyor to a second conveyor.

16. The method according to claim 13, further comprising:
   detecting when each of the at least two articles has reached the desired orientation, and in response ceasing rotation of each article respectively.

17. A method of rotating articles to be packaged, which method comprises:
   conveying articles in a stream track of unpackaged articles;
   engaging a first group of at least two articles with a first tool head rotator assemblies;
   observing the at least two articles with a single sensor;
   rotating each of the at least two articles from a first orientation until they assume a desired orientation, as detected by the sensor, whilst those articles are being conveyed; and
   engaging a second group of at least two further articles with a second tool head;
   observing the at least two further articles with a single second sensor;
   rotating each of the at least two further articles from a first orientation until they assume a desired orientation, as detected by the second sensor, whilst those articles are being conveyed; and
   combining the first group of at least two articles with the second group of at least two further articles into a single article grouping.

18. An article orientation system comprising:
   an article gripper;
   a motion controller;
   a motion device in communication with the motion controller and coupled to the article gripper;
   a sensor;
   wherein the sensor is adapted to recognize a predefined marker characteristic of an article;
   and wherein the sensor issues a signal to the motion controller indicative of the predefined marker characteristic of the article;
   the motion controller issues a signal to the motion device to rotate the article by an angle of rotation determined based on the signal indicative of the predefined maker so as to place the article in a predefined orientation.

* * * * *